(12) United States Patent
Maeda et al.

(10) Patent No.: US 7,882,913 B2
(45) Date of Patent: Feb. 8, 2011

(54) COOLING MODULE

(75) Inventors: Akihiro Maeda, Kariya (JP); Toshinao Aoki, Okazaki (JP); Kazuya Murata, Kuwana (JP); Kenichi Maruyama, Hekinan (JP)

(73) Assignee: Denso Corporation, Kariya (JP)

( * ) Notice: Subject to any disclaimer, the term of this patent is extended or adjusted under 35 U.S.C. 154(b) by 753 days.

(21) Appl. No.: 11/788,828

(22) Filed: Apr. 20, 2007

(65) Prior Publication Data

US 2007/0246280 A1 Oct. 25, 2007

(30) Foreign Application Priority Data

Apr. 21, 2006 (JP) ............................. 2006-118142
Aug. 3, 2006 (JP) ............................. 2006-212042

(51) Int. Cl.
 *B60K 11/04* (2006.01)
(52) U.S. Cl. ..................................... 180/68.4; 180/68.6
(58) Field of Classification Search ................ 180/68.4, 180/68.6, 68.1, 68.2; 165/42, 138
See application file for complete search history.

(56) References Cited

U.S. PATENT DOCUMENTS

| | | | | |
|---|---|---|---|---|
| 3,121,467 A | * | 2/1964 | Bryant | 180/68.4 |
| 3,123,170 A | * | 3/1964 | Bryant | 180/68.4 |
| 4,538,697 A | * | 9/1985 | Muroi et al. | 180/68.4 |
| 4,564,168 A | * | 1/1986 | Ikuta et al. | 248/638 |
| 4,579,184 A | * | 4/1986 | Hiramoto | 180/68.4 |
| 4,662,432 A | * | 5/1987 | Suzuki | 165/41 |
| 4,766,968 A | * | 8/1988 | Matsunaga | 180/68.4 |
| 4,821,828 A | * | 4/1989 | Schwerzler et al. | 180/68.4 |
| 5,269,367 A | * | 12/1993 | Susa et al. | 165/41 |
| 5,287,940 A | * | 2/1994 | Ogawa et al. | 180/68.4 |
| 5,785,140 A | * | 7/1998 | Suzuki et al. | 180/68.4 |
| 5,875,836 A | * | 3/1999 | Nakamura | 165/122 |
| 5,996,684 A | * | 12/1999 | Clifton et al. | 165/67 |
| 6,158,500 A | * | 12/2000 | Heine | 165/67 |
| 6,382,312 B2 | * | 5/2002 | Avequin et al. | 165/140 |
| 6,408,933 B2 | * | 6/2002 | Fukuoka et al. | 165/67 |
| 6,510,891 B2 | * | 1/2003 | Anderson et al. | 165/67 |
| 6,571,898 B2 | * | 6/2003 | Guyomard | 180/68.4 |
| 6,609,558 B1 | * | 8/2003 | Charbonnelle | 165/67 |
| 6,874,570 B2 | * | 4/2005 | Horiuchi | 165/140 |
| 7,059,392 B2 | * | 6/2006 | Kovac | 165/140 |
| 7,117,926 B2 | * | 10/2006 | Mori et al. | 165/67 |
| 7,287,574 B2 | * | 10/2007 | Desai et al. | 165/67 |
| 2001/0001994 A1 | * | 5/2001 | Enomoto et al. | 180/68.4 |
| 2001/0040021 A1 | * | 11/2001 | Avequin et al. | 165/67 |

(Continued)

FOREIGN PATENT DOCUMENTS

JP  2001-301474  10/2001

*Primary Examiner*—J. Allen Shriver, II
*Assistant Examiner*—Vaughn T Coolman
(74) *Attorney, Agent, or Firm*—Harness, Dickey & Pierce, PLC

(57) ABSTRACT

A cooling module capable of reducing vibration in a compartment attributable to the discharge pulsation of the compressor is disclosed. The cooling module comprises a radiator (1) mounted to a vehicle for cooling the cooling water by heat exchange between the cooling water and the air, and a condenser (2) for condensing the refrigerant by heat exchange between the refrigerant circulated in the refrigeration cycle and the air. The radiator (1) is fixed to the vehicle, and the condenser (2) is fixed to the radiator (1) through elastically deformable rubber bushings (3).

16 Claims, 19 Drawing Sheets

U.S. PATENT DOCUMENTS

2002/0157812 A1* 10/2002 Anderson et al. ............. 165/67
2006/0207815 A1* 9/2006 Vandekerkhof ............ 180/68.4
2006/0225933 A1* 10/2006 Kwun et al. ................ 180/68.6
2006/0237175 A1* 10/2006 Hara .......................... 165/140

* cited by examiner

COOLING MODULE

BACKGROUND OF THE INVENTION

1. Field of the Invention

This invention relates to a cooling module including a plurality of heat exchangers assembled integrally on each other.

2. Description of the Related Art

Conventionally, heat exchangers such as a radiator and a condenser of automotive vehicles are mounted on a vehicle body individually. In particular, the condenser is mounted on the vehicle body through an elastic member (rubber bushing) to suppress the spread of the discharge pulsation of the refrigerant from the compressor in the refrigeration cycle to the vehicle body thereby reducing noise in the compartment.

In recent years, however, a major trend has been to develop an assembly method in which heat exchangers and the front portion of a vehicle are integrally mounted as a module on the vehicle body. An example is a cooling module with a radiator and condenser integrally mounted, and includes various structures that have been conceived (for example, Japanese Unexamined Patent Publication No. 2001-301474).

With regard to this cooling module, a method is known in which after the condenser is fixed to the radiator, the radiator is then directly assembled on the vehicle body.

SUMMARY OF THE INVENTION

In the aforementioned method with the condenser fixed directly to the radiator, the discharge pulsation of the refrigerant of the compressor is propagated to the vehicle body through the radiator, thereby posing a problem in that vibrations in the compartments have increased. In some cases, the radiator with the condenser fixed thereon is mounted on the vehicle body through a vibration-proof rubber. However, in many of these cases, vibrations in the compartments cannot be sufficiently suppressed.

The present inventors have studied the cause of this problem and found that the vibration is a result of the discharge pulsation of the refrigerant of the compressor being amplified by the resonance with the condenser and spread to the vehicle body.

Generally, the vibration-proof structure of the cooling module is designed so that the cooling module works as dynamic damper for suppressing engine vibration. In this way, the vibration mainly caused by the combustion of the engine is prevented from being spread to the vehicle body as a whole, the steering system thereby causing the discomfort to the occupants. In the process, the spring constant of the rubber damper is tuned to secure the vertical natural frequency of the vibration-proof rubber substantially equal to the engine vibration (about 17 to 20 Hz).

However, in the horizontal direction of the vehicle, the spring constant is not specified, and generally designed in an arbitrary way as occasion demands. As a result, the vibration caused by the discharge pulsation of the refrigerant of the compressor is amplified in the condenser and spread to the vehicle body through the radiator, thereby posing a problem in that noise in the compartment during operation of the air-conditioner is increased and causes discomfort to the occupants.

In view of this problem, the object of this invention is to provide a cooling module capable of reducing the vibration in the compartment attributable to the discharge pulsation of the compressor.

Another object of the invention is to provide a cooling module capable of reducing the spread of engine idle vibration to the vehicle body and the steering system.

In order to achieve the aforementioned objects, according to a first aspect of this invention, there is provided a cooling module comprising a radiator (1) mounted on the vehicle for cooling the water by heat exchange between the water and the air and a condenser (2) for condensing the refrigerant by heat exchange between the refrigerant circulated in the refrigeration cycle and air, wherein the radiator (1) is fixed to the vehicle body, and wherein the condenser (2) is fixed to the radiator (1) through elastically deformable elastic members (3, 30).

In this aspect of the invention, the discharge pulsation of the compressor in the refrigeration cycle is absorbed into the elastic members (3, 30), and therefore, prevented from being spread from the condenser (2) to the radiator (1) and further to the vehicle body. As a result, vibration in the compartment caused by the discharge pulsation of the compressor can be reduced.

According to a second aspect of this invention, there is provided a cooling module comprising mounting members (6) for fixing the condenser (2) to the radiator (1), wherein protrusions (2c) are formed on the outer peripheral portion of the condenser (2), and elastic members (3, 30) are arranged to cover the protrusions (2c), and wherein mounting members (4) can be fixed on the protrusions (2c) through the elastic members (3, 30).

According to a third aspect of this invention, there is provided a cooling module comprising mounting members (6) for fixing the condenser (2) to the radiator (1), wherein the mounting member (6) is formed with a depressed receptacle (61) into which the outer peripheral portion of the condenser (2) is adapted to be placed and fitted, and wherein the elastic member (30) can be arranged at the portion of the receptacle (61) fitted with the outer peripheral portion of the condenser (2) therein.

According to a fourth aspect of the invention, there is provided a cooling module, wherein the radiator (1) includes a radiator core (1a) having a plurality of tubes with cooling water flowing therein and a pair of radiator tanks (1b) extending in the direction perpendicular to the length of the tubes at the longitudinal ends of the tubes and communicating with the tubes, wherein the radiator tanks (1b) are arranged at the vertical ends of the radiator core (1a) and make up a downflow heat exchanger with cooling water flowing vertically, and wherein the mounting members (4, 6) can be fixed to the radiator tanks (1b).

According to a fifth aspect of this invention, there is provided a cooling module, wherein the radiator (1) is fixed to the vehicle body (8) through elastically deformable support members (7), and the natural frequency of the elastic support members (7) or the elastic members (3, 30) is set to not less than twice the natural frequency of the elastic members (3, 30) or the elastic support members (7), respectively.

Generally, the radiator (1) is designed to work as a mass of a dynamic damper for suppressing engine vibration. By mounting the radiator (1) and the condenser (2) integrally as a cooling module, however, it has been found that the operation of the radiator (1) as a dynamic damper may be hampered.

As the result of a study by the present inventors (FIGS. 17A to 17C), however, it has been found that the operation of the radiator (1) as the dynamic damper is prevented from being hampered by setting the natural frequency of the elastic support members (7) or the elastic members (3, 30) to at least twice the natural frequency of the elastic members (3, 30) or the elastic support members (7), respectively. Thus, the spread of engine idle vibration to the vehicle body (8) and steering system can be reduced.

According to a sixth aspect of this invention, there is provided a cooling module, wherein the natural frequency of the elastic members (3, 30) is set to at least twice the natural frequency of the elastic support members (7).

In view of the fact that the natural frequency of the elastic members (3, 30) can be prevented from being included in the critical frequency range (the oscillation frequency which may be generated in a running vehicle). Thus, the condenser (2) can be prevented from resonating by vehicle vibration, while at the same time making it possible to reduce engine vibration spread to the vehicle body (8) and steering system in idle mode.

According to a seventh aspect of this invention, there is provided a cooling module, wherein the refrigeration cycle includes a compressor for compressing and discharging refrigerant, and wherein the natural frequency of the elastic members (3, 30) is set lower than the oscillation frequency generated by the discharge pulsation of the refrigerant in the compressor in such a manner that the elastic members (3, 30) attenuate the vibration generated by the discharge pulsation over the whole oscillation frequency range thereof.

Due to the interposition of the elastic members (3, 30) between the condenser (2) and the radiator (1), vibration of the condenser (2) generated by the discharge pulsation of the refrigerant of the compressor is prevented by the elastic members (3, 30) from being spread to the vehicle body (8) through the radiator (1).

Also, it is theoretically known that vibration-proof members such as elastic members (3, 30) have a transmissibility of less than unity and attenuate vibration, when the oscillation frequency is greater than $\sqrt{2}$ times the natural frequency of vibration of the members.

By setting the natural frequency of the elastic members (3, 30) to a level lower than the oscillation frequency to attenuate the vibration of the elastic members (3, 30) over the whole range of the oscillation frequency of the vibration generated by the discharge pulsation of the refrigerant of the compressor, vibration of the condenser (2) can be prevented from being spread to the vehicle body (8), and therefore, vibration in the compartments caused by the discharge pulsation of the compressor can be reduced.

According to an eighth aspect of this invention, there is provided a cooling module, wherein the natural frequency of the elastic members (3, 30) is set to a level lower than $1/\sqrt{2}$ times the oscillation frequency.

According to a ninth aspect of this invention, there is provided a cooling module, wherein the natural frequency of the elastic members (3, 30) is set to a level lower than ½ times the oscillation frequency. As a result, the vibration of the condenser (2) can be prevented from being spread to the vehicle body (8), and therefore, vibration in the compartments caused by the discharge pulsation of the compressor can be further reduced.

Reference numerals inserted in each parenthesis attached to the name of each means above indicates the correspondence with the specific means in the embodiments described later.

The present invention may be more fully understood from the description of the preferred embodiments of the invention, as set forth below, together with the accompanying drawings.

DESCRIPTION OF THE PREFERRED EMBODIMENTS

First Embodiment

A first embodiment of the invention is explained below with reference to FIGS. 1 to 4. The cooling module according to this embodiment is used in an automotive vehicle and mounted on the front end portion of the vehicle having an engine (internal combustion engine) as a running drive source.

Figure 1:
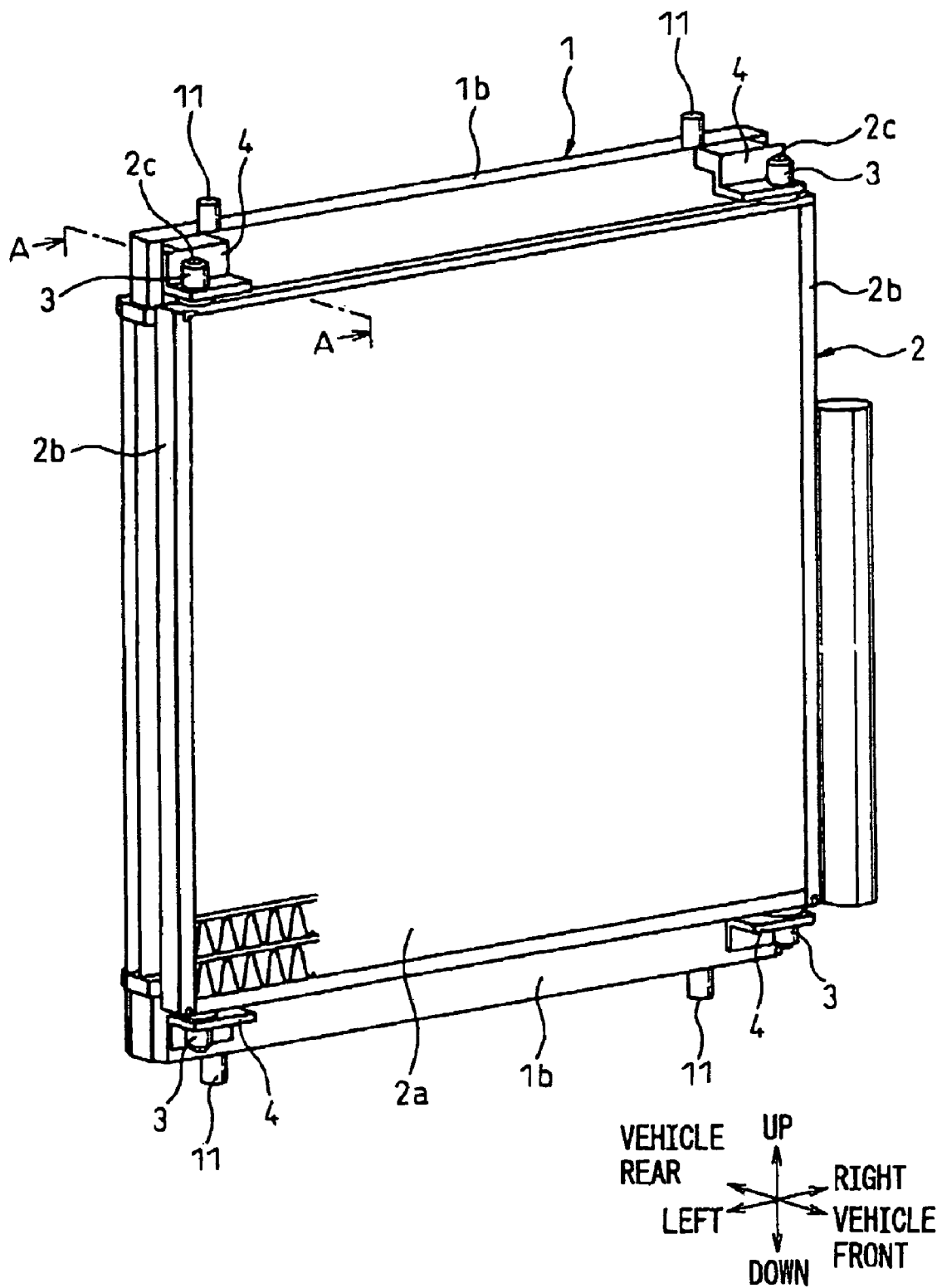
FIG. 1 is a perspective view of a cooling module as viewed from the vehicle front according to a first embodiment of the invention.
Figure 2:
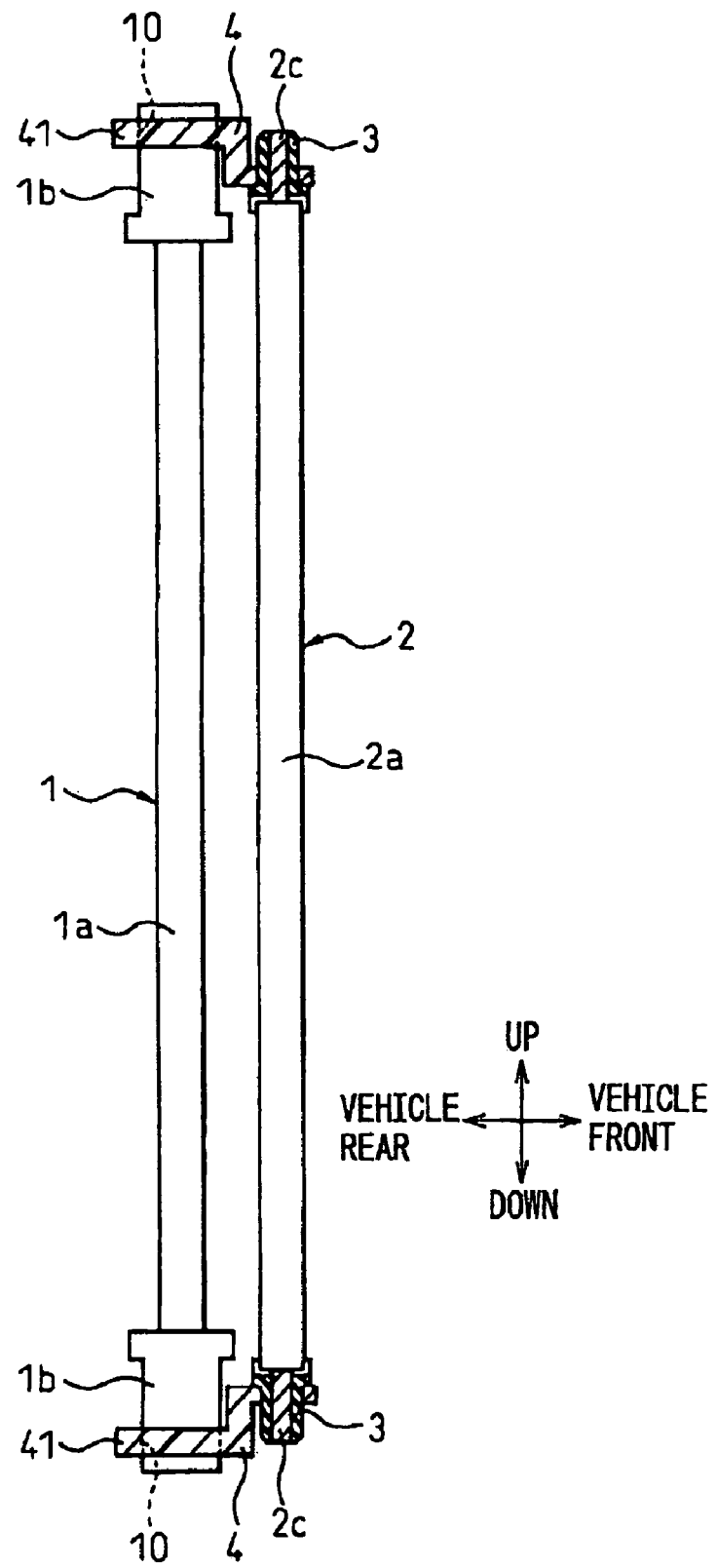
FIG. 2 is a sectional taken along line A-A in FIG. 1.

FIG. 1 is a perspective view of the cooling module according to the first embodiment of the invention as viewed from the vehicle front, and FIG. 2 a sectional view taken along line A-A in FIG. 1.

As shown in FIGS. 1 and 2, the cooling module includes a radiator 1 for cooling water by heat exchange between the cooling water of the engine, not shown, and atmospheric air, a condenser 2 for cooling the refrigerant by heat exchange between atmospheric air and refrigerant circulated in the automotive refrigeration cycle (climate control system) not shown, an electrically-operated blower (not shown) for blowing cooling air to the radiator 1 and condenser 2, and a shroud (not shown) for guiding air flow induced by the electrically-operated blower into the radiator 1 and condenser 2.

The condenser 2 is arranged upstream of the radiator 1 in the air flow, i.e. nearer the front of the vehicle. The shroud, on the other hand, is arranged downstream of the radiator 1 in the air flow (closer to the rear of the vehicle) in such a manner as to cover the back (the surface facing the rear of the vehicle) of the radiator 1.

The radiator 1 is a heat exchanger for cooling the engine water by heat exchange between the engine cooling water and atmospheric air. The radiator 1 includes a radiator core 1a having a plurality of radiator tubes with cooling water flowing therein and a pair of radiator tanks 1b arranged at the longitudinal ends of the radiator tubes and communicating with the radiator tubes.

The radiator 1 according to this embodiment is a downflow heat exchanger with cooling water flowing therein vertically, and the length of the radiator tubes extends in a vertical direction, while the radiator tanks 1b are arranged at the upper and lower ends of the radiator core 1a.

A through hole 10 is formed at each longitudinal end of each radiator tank 1b. The through hole 10 is formed through the radiator tank 1b. One of the openings of the through hole 10 of each radiator tank 1b is formed on the surface (forward on the vehicle) on which the condenser 2 is fixed, and the other opening is formed on the opposite surface (rearward on the vehicle) far from the side on which the condenser 2 is fixed. Specifically, each through hole 10 is formed rearward through the front of the vehicle.

The radiator tank 1b has a pair of protrusions 11 for fixing the radiator 1 to the vehicle body (not shown). The protrusions 11 are arranged at the longitudinal ends of the radiator tank 1b and projected vertically.

The condenser 2 is a heat exchanger for cooling refrigerant by heat exchange between atmospheric air and the refrigerant circulated in the refrigeration cycle (not shown). The condenser 2, like the radiator 1, includes a condenser core 2a formed of a plurality of condenser tubes with refrigerant flowing therein and a pair of condenser tanks 2b arranged at the longitudinal ends of the condenser tubes and communicating with the condenser tubes.

The condenser 2 according to this embodiment is a crossflow heat exchanger with refrigerant flowing in a horizontal direction. The length of the condenser tubes extends in a horizontal direction, and the condenser tanks 2b are arranged at the horizontal ends, respectively, of the condenser core 2a.

The upper and lower surfaces at the outer peripheral portion of the condenser 2 each have a pin 2c projected in a vertical direction. An elastically deformable rubber bushing 3 is mounted on the pin 2c. The rubber bushing 3 is arranged to cover the corresponding pin 2c. The pin 2c corresponds to the protrusion according to this invention, and the rubber bushing 3 to the elastic member.

Figure 3:
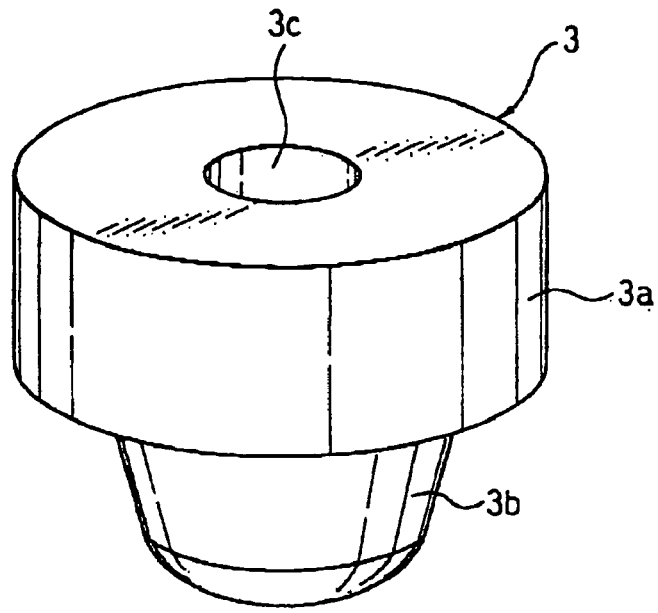
FIG. 3 is a perspective view of a rubber bushing 3 according to the first embodiment of the invention.

FIG. 3 is a perspective view showing the rubber bushing 3 according to the first embodiment. As shown in FIG. 3, the rubber bushing 3 has a cylindrical portion 3a and a substantially conical portion 3b. The rubber bushing 3 is formed with a through hole 3c along the axis of the cylindrical portion 3a and the substantially conical portion 3b. The through hole 3c is fitted on the corresponding pin 2c of the condenser 2 thereby to fix the rubber bushing 3 on the pin 2c.

Returning to FIGS. 1 and 2, a pair of plastic brackets 4 are assembled on the upper and lower surfaces of the condenser 2. According to this embodiment, the pins 2c having rubber bushings 3 mounted thereon are inserted into through holes 40, described later, of the brackets 4 thereby to assemble the brackets 4 on the condenser 2. The bracket 4 corresponds to the mounting member according to the invention.

Figure 4:
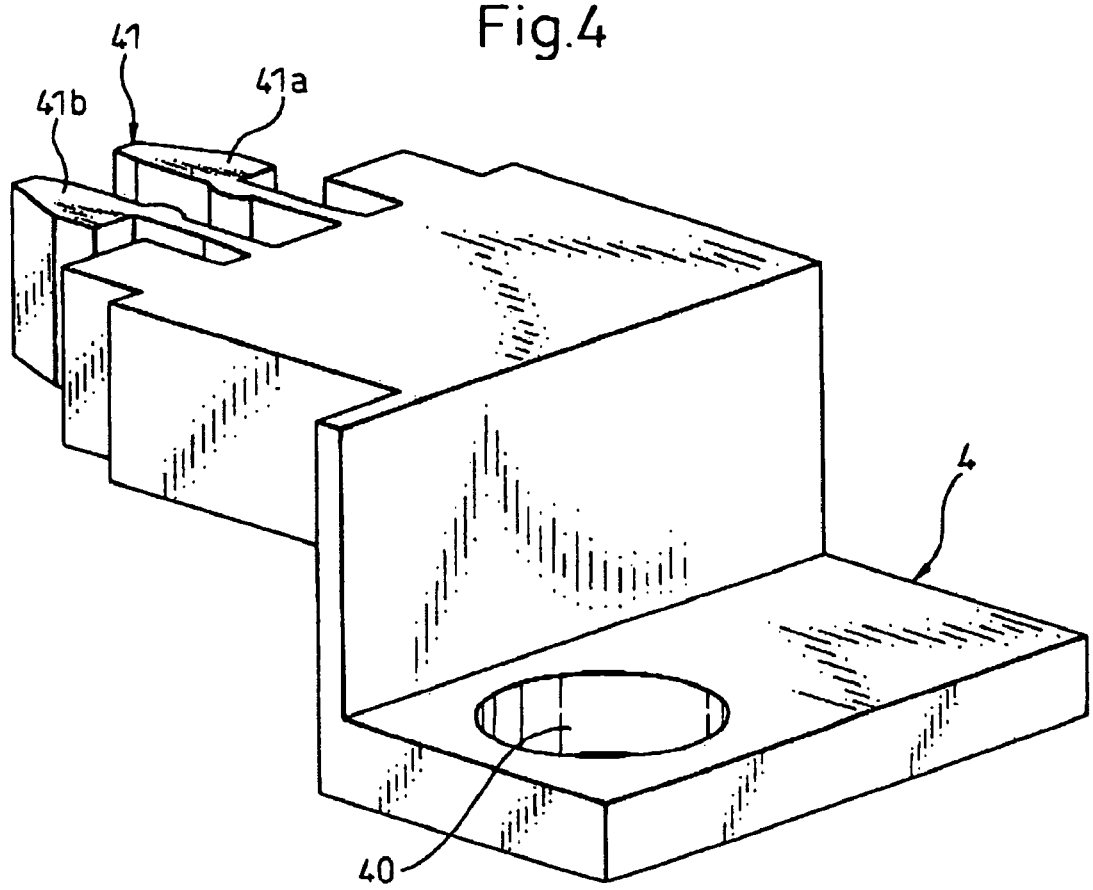
FIG. 4 is a perspective view of a bracket 4 according to the first embodiment of the invention.

FIG. 4 is a perspective view showing the bracket 4 according to the first embodiment of the invention. As shown in FIG. 4, the portion of the bracket 4 corresponding to the pin 2c is formed with the through hole 40. The bracket 4 also has an elastically deformable hook 41 projected toward the radiator 1 (rearward on the vehicle).

The hook 41, configured to be fitted in the through hole 10 of the radiator 1, is adapted to be inserted from one opening of the through hole 10 and engaging the edge of the other opening. The hook 41 includes a pair of elastically deformable engaging pieces 41a, 41b. The engaging pieces 41a, 41b are each formed with a protrusion adapted to engage the edge of the other opening of the through hole 10.

The hook 41, inserted into the through hole 10 while being pressed against the inner wall of the through hole 10, has engaging pieces 41a, 41b elastically deformed in proximity to each other. After the hook 41 is inserted through the hole 10, the elastic deformation of the engaging piece pair 41a, 41b is canceled, so that the protrusion engages the edge of the other opening. With each hook 41 engaging the through hole 10 in this way, the brackets 4 are fixed on the radiator 1.

Next, the steps of assembling and mounting the cooling module on the vehicle are explained.

First, the lower brackets 4 are mounted on the lower radiator tank 1b. The rubber bushing 3 is mounted on the corresponding pin 2c of the condenser 2 in advance. Each lower pin 2c is inserted into the corresponding through hole 40 of the lower bracket 4. Next, each through hole 40 of the upper bracket 4 is fitted on the corresponding upper pin 2c of the condenser 2, so that the bracket 4 engages the corresponding through hole 10 of the upper radiator tank 1b. In another step, the shroud and the blower are integrated with each other by coupling the blower (not shown) with the shroud (not shown).

The shroud is assembled on the radiator 1 and the condenser 2, which are integrated with each other. As a result, a cooling module having the radiator 1, the condenser 2, the shroud and the blower, integrated with each other, is completed.

Next, the cooling module is mounted on the vehicle. Specifically, the protrusions 11 of the radiator 1 are fitted on a part of the vehicle body (not shown). As a result, the cooling module is completely assembled and mounted on the vehicle.

As described above, the radiator 1 and the condenser 2 are fixed to each other through the elastically deformable rubber bushings 3. Therefore, discharge pulsation of the compressor is absorbed into the rubber bushings 3 and prevented from being spread from the condenser 2 to the radiator 1 and further to the vehicle body. As a result, vibration caused in the compartment by the discharge pulsation of the compressor is reduced.

Also, the fact that the brackets 4 are fixed to the radiator 1 by engagement of the hooks 41 in the through holes 10 eliminates the need of another fastening member such as a bolt. Thus, the number of parts is reduced resulting in a lower cost.

Second Embodiment

Next, a second embodiment of the invention is explained with reference to FIGS. 5 to 8. The component parts similar to those of the first embodiment are designated by the same reference numerals, respectively, and not described hereafter.

Figure 5:
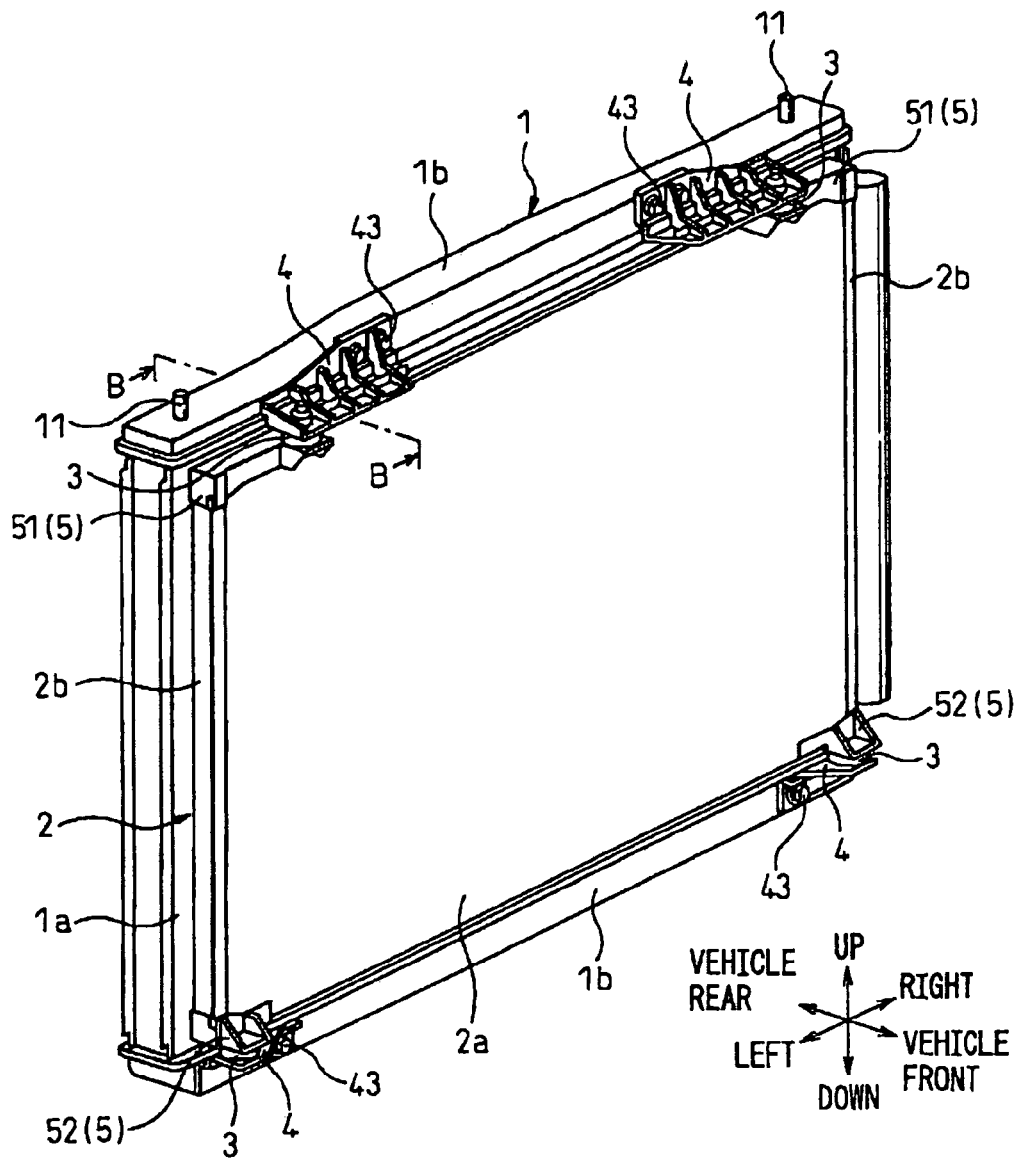
FIG. 5 is a perspective view showing a cooling module according to a second embodiment of the invention.
Figure 6:
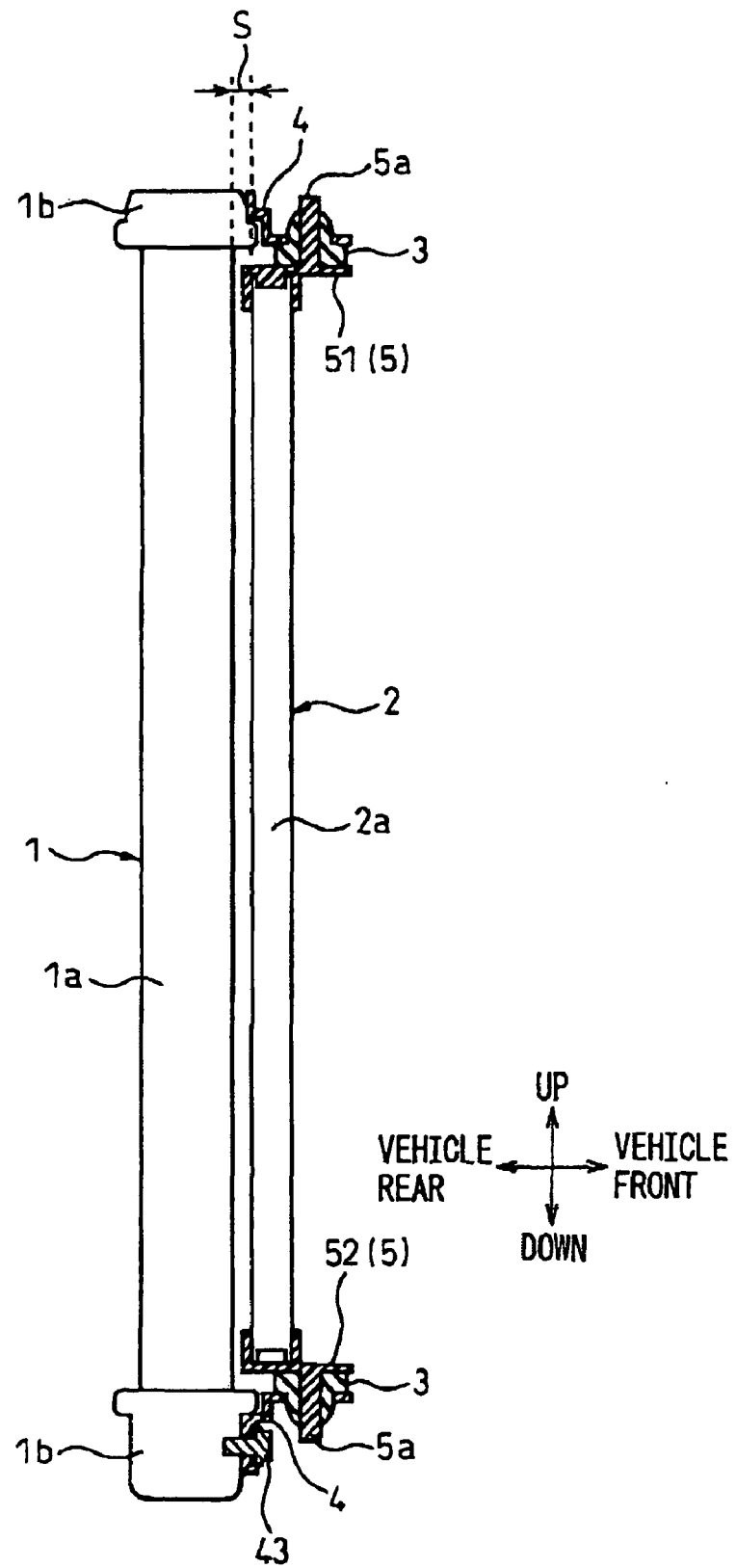
FIG. 6 is a sectional view taken along line B-B in FIG. 5.

FIG. 5 is a perspective view showing a cooling module according to a second embodiment of the invention, and FIG. 6 a sectional view taken along line B-B in FIG. 5. As shown in FIGS. 5 and 6, brackets 5 each with a pin having a vertically projected pin portion 5a (hereinafter referred to as the bracket (s) with a pin 5) are arranged on the upper and lower surfaces of the condenser 2. Each bracket with a pin 5 arranged on the upper surface of the condenser 2 is hereinafter referred to as the upper bracket with a pin 51, and each lower bracket with a pin 5 arranged on the lower surface of the condenser 2 as the lower bracket with a pin 52. The pin portion 5a corresponds to the protrusion according to the invention.

Figure 7:
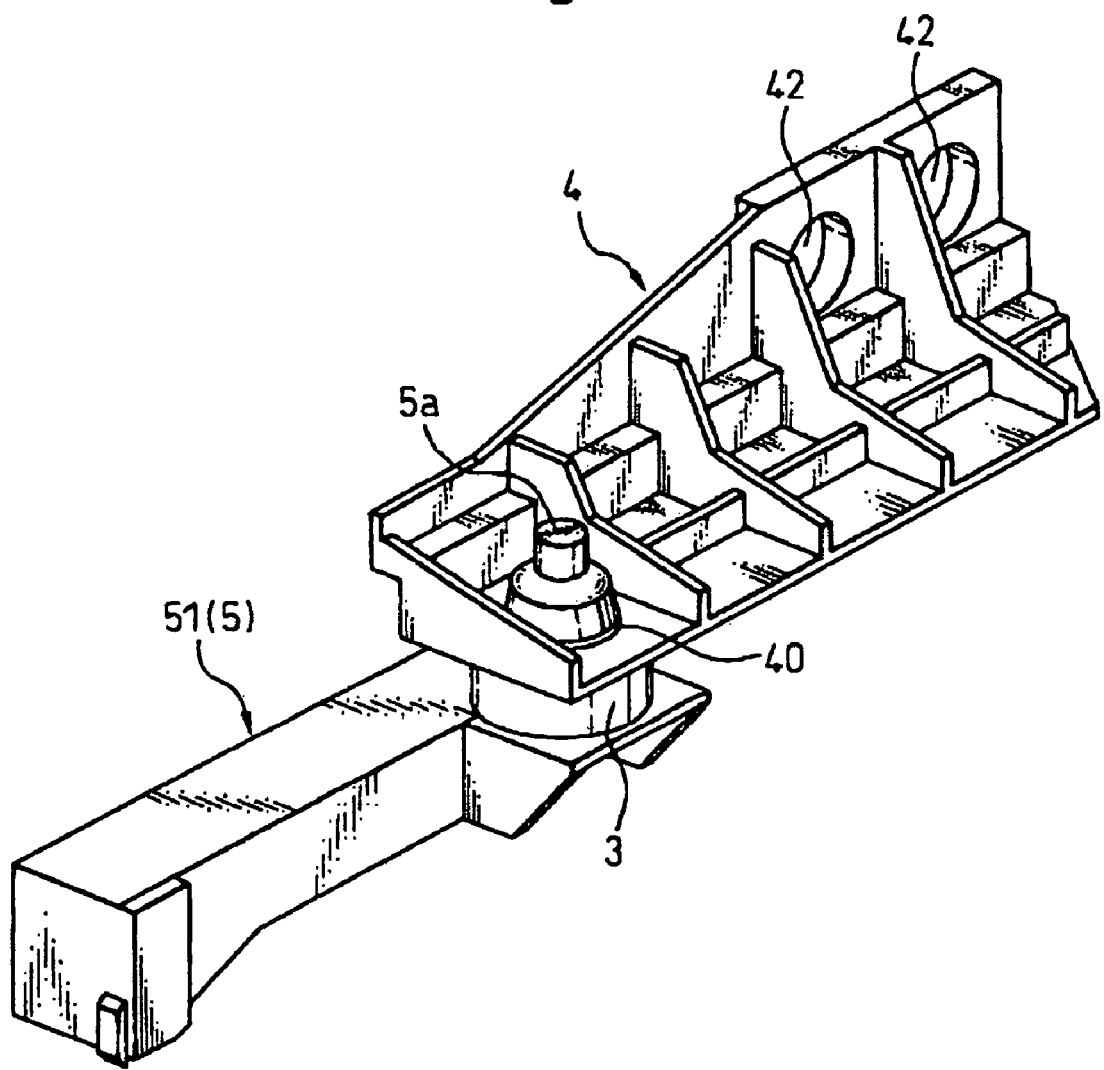
FIG. 7 is a perspective view showing the neighborhood of an upper bracket with a pin 51 according to the second embodiment of the invention.

FIG. 7 is a perspective view showing the is neighborhood of the upper bracket with a pin 51 according to the second embodiment. As shown in FIG. 7, a rubber bushing 3 is mounted on the pin portion 5a of the upper bracket with a pin 51, and a fastening bracket 4 is mounted through the rubber bushing 3. The fastening bracket 4 corresponds to the mounting member according to the invention.

The portion of each fastening bracket 4 in opposed relation to the rubber bushing 3 is formed with a through hole 40. The rubber bushing 3 is inserted in the through hole 40, and the fastening bracket 4 is fixed to the upper bracket with a pin 51. As a result, the fastening brackets 4 are fixed to the condenser 2.

Also, the portion of each fastening bracket 4 in opposed relation to the radiator tank 1b is formed with a pair of bolt holes 42. Bolts 43 are inserted in the bolt holes 42 (FIG. 5), and fastening brackets 4 are fixed to the radiator tank 1b.

Figure 8:
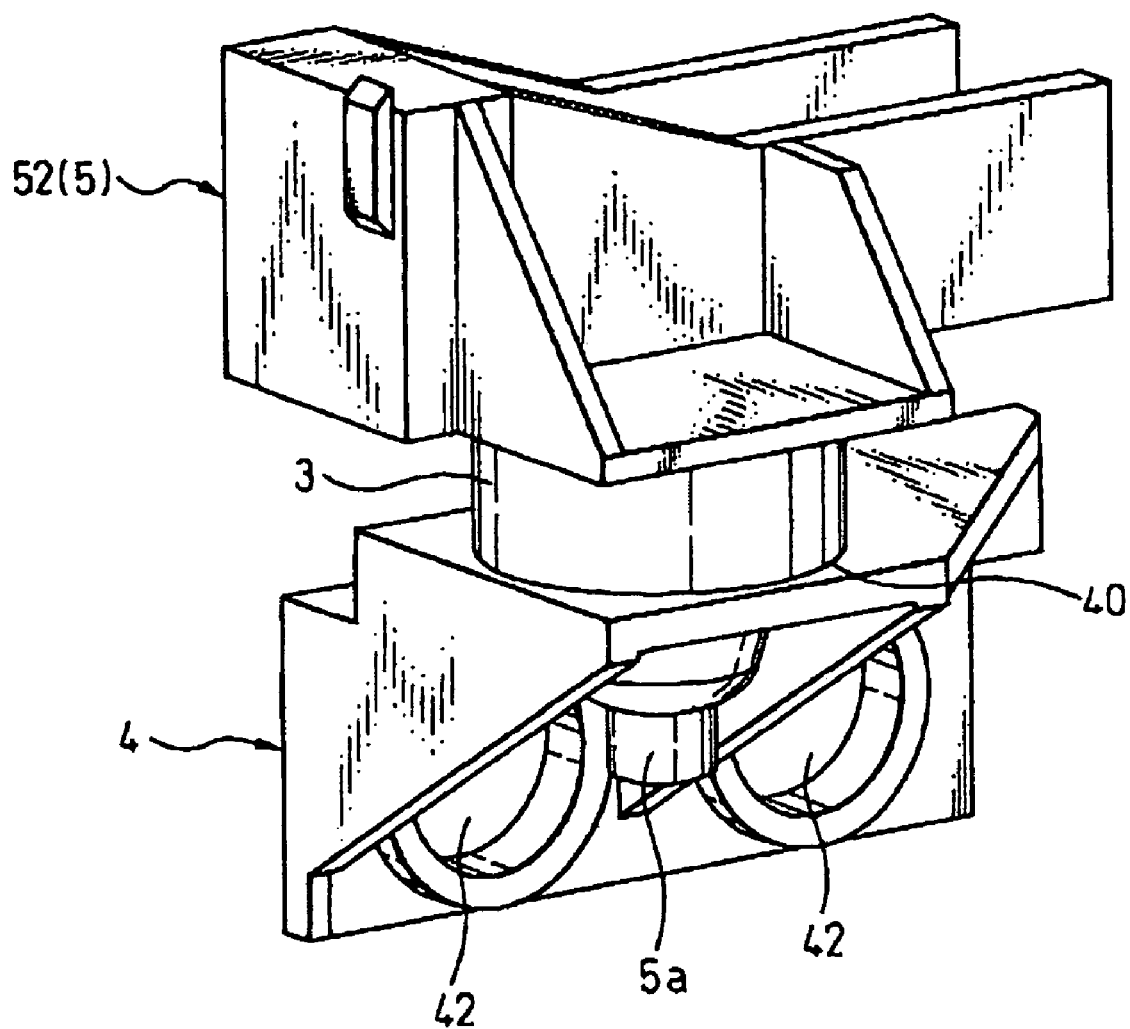
FIG. 8 is a perspective view showing the neighborhood of a lower bracket with a pin 5 according to the second embodiment of the invention.

FIG. 8 is a perspective view showing the neighborhood of the lower bracket with a pin 52 according to the second embodiment. The lower bracket with a pin 52 is different in shape, but has the same function as the upper bracket with a pin 51. Therefore, the component parts of the lower bracket with a pin 52 similar to those of the upper bracket with a pin 51 are designated by the same reference numerals, respectively, and not described.

As explained above, the brackets with a pin 5 are arranged on the condenser 2 and the pin portion 5a of each bracket with a pin 5 and the fastening bracket 4 are fitted to each other through the elastically deformable rubber bushing 3, so that the condenser 2 can be fixed to the radiator 1. As a result, similar effects as in the first embodiment can be obtained.

The use of the bracket with a pin 5 makes it possible to set each pin portion 5a (protrusion) at an arbitrary position on the outer peripheral portion of the condenser 2. According to this embodiment, the pins 5a are arranged on the surface of the condenser 2 far from the radiator 1, and therefore, the gap S (FIG. 6) between the radiator 1 and the condenser 2 can be reduced. As a result, heat exchange performance of the condenser 2 is improved, while at the same time reducing the size of the cooling module for improved mountability on the vehicle.

Third Embodiment

Next, a third embodiment of the invention is explained with reference to FIGS. 9 to 11. The third embodiment is different from the second embodiment in that the upper brackets with a pin 51 are eliminated and the fastening brackets 4 are replaced with brackets with a rubber piece 6. The component parts similar to those of the second embodiment are designated by the same reference numerals, respectively, and not described hereafter.

Figure 9:
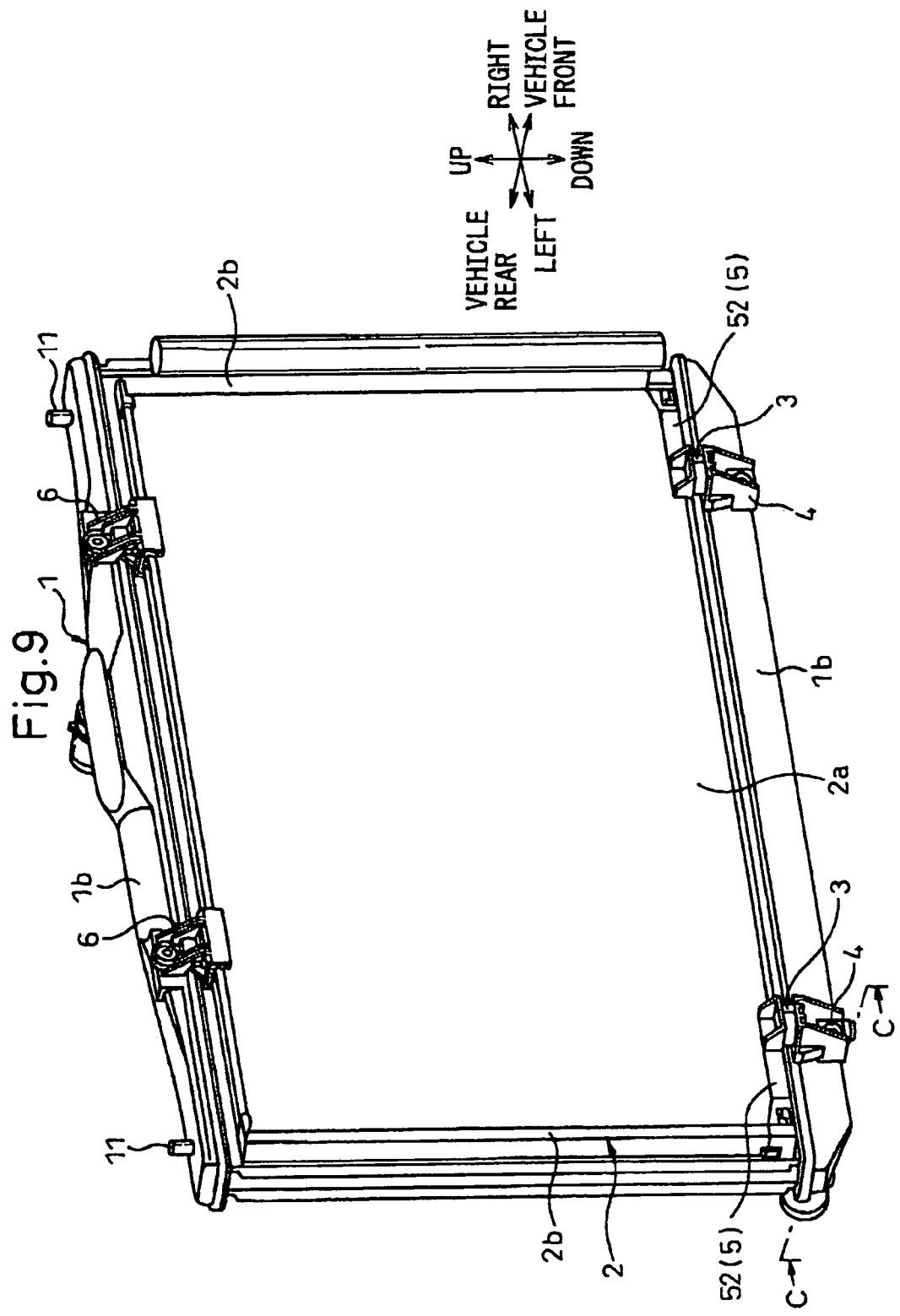
FIG. 9 is a perspective view showing a cooling module according to a third embodiment of the invention.
Figure 10:
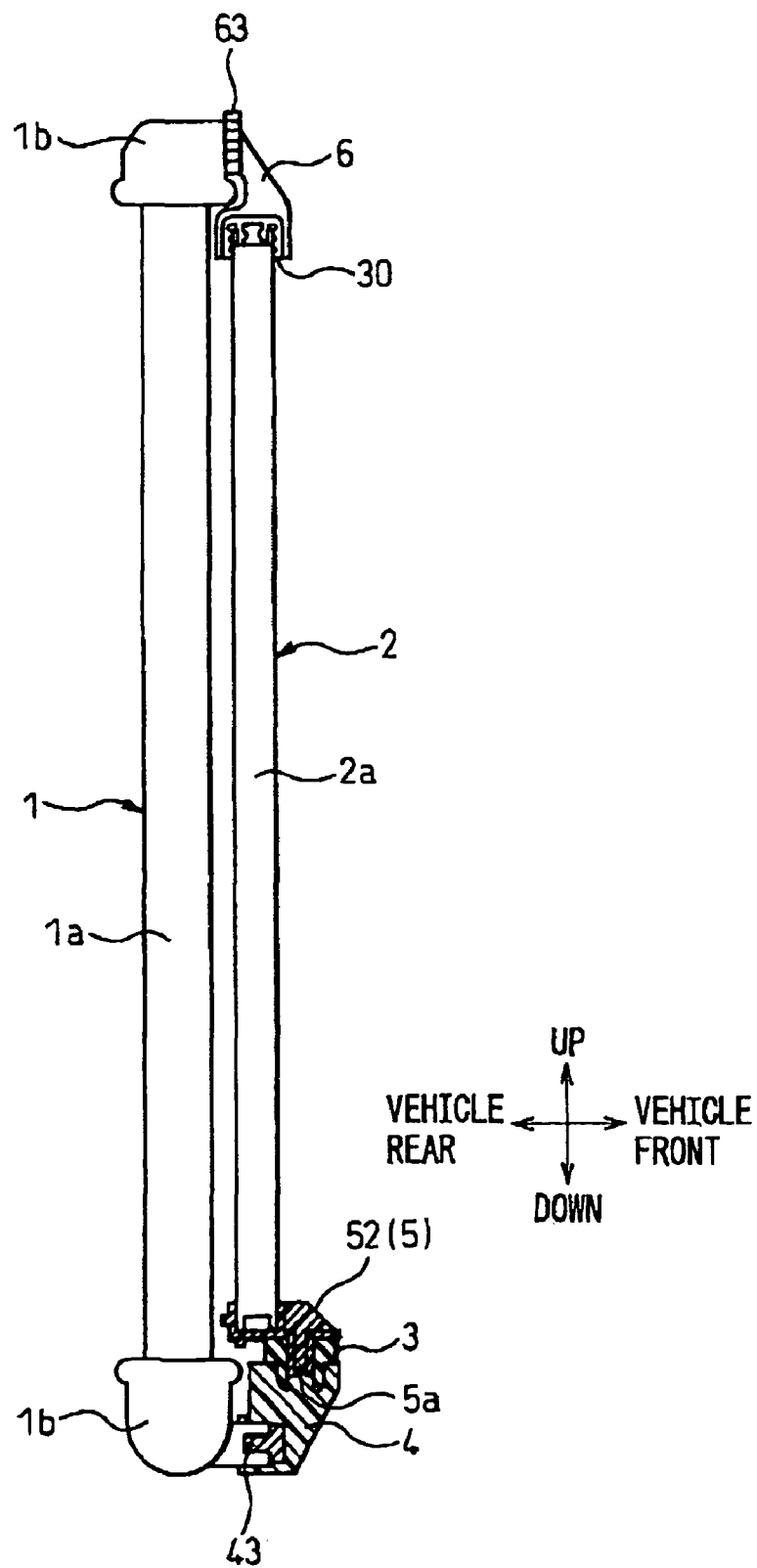
FIG. 10 is sectional view taken along line C-C in FIG. 9.

FIG. 9 is a perspective view of a cooling module according to the third embodiment, and FIG. 10 a sectional view taken along line C-C in FIG. 9. As shown in FIGS. 9 and 10, the brackets with a rubber piece 6 are mounted on the upper surface of the condenser 2. The bracket with a rubber piece 6 corresponds to the mounting member according to the invention.

Figure 11:
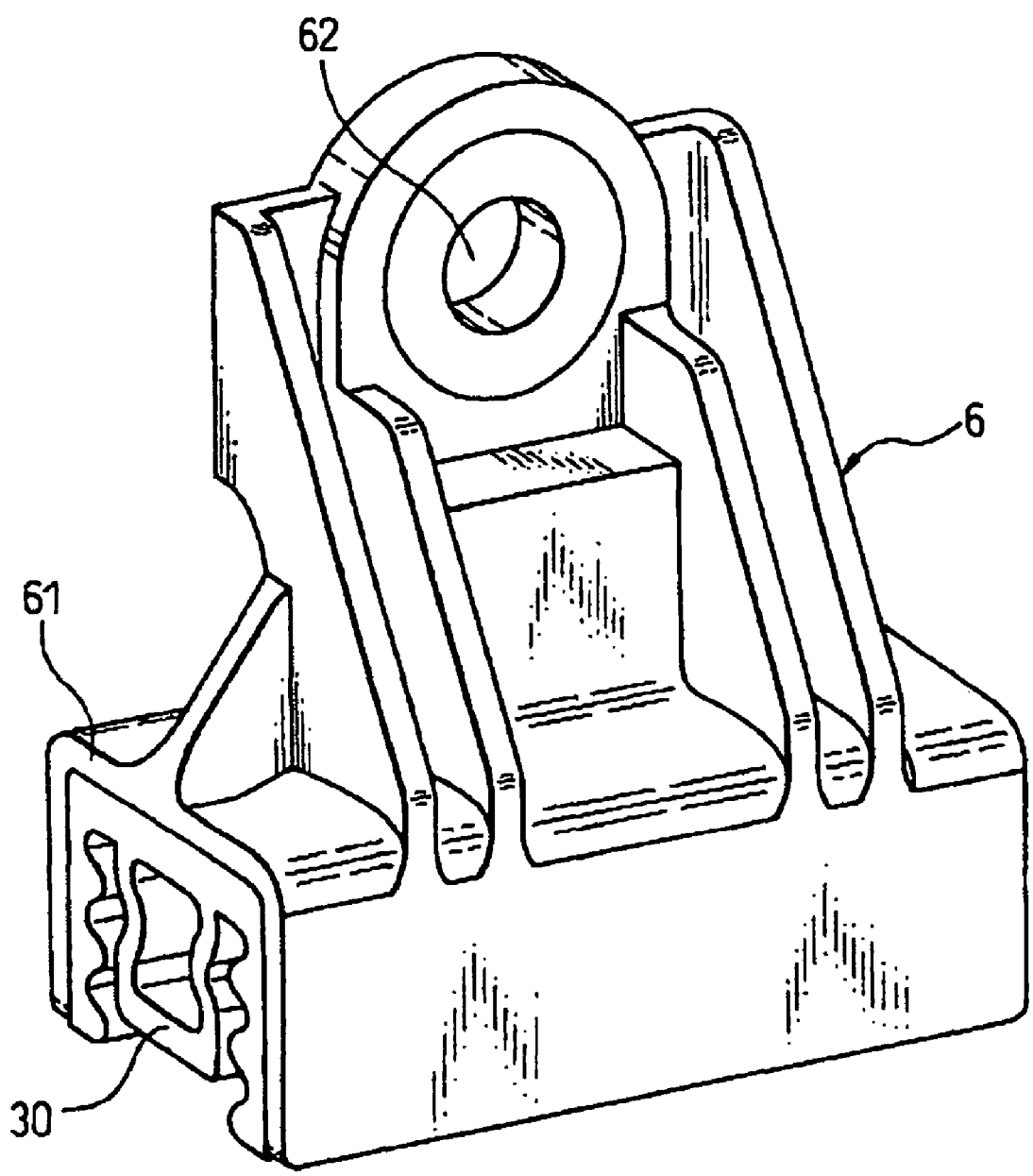
FIG. 11 is a perspective view of a bracket with a rubber piece 6 according to the third embodiment of the invention.

FIG. 11 is a perspective view showing the bracket with a rubber piece 6 according to the third embodiment. As shown in FIG. 11, the surface of the bracket with a rubber piece 6 in opposed relationship to the upper end of the condenser 2 is formed with a substantially channel-shaped receptacle 61 adapted to be fitted in the upper end portion of the condenser 2. An elastically deformable rubber bushing 30 is arranged on the inside of the receptacle 61 of the bracket with a rubber piece 6. According to this embodiment, each rubber bushing 30 is formed in such a shape as to be fitted to the upper end of the condenser 2. The rubber bushing 30 corresponds to the elastic member according to the invention.

Also, the portion of the bracket with a rubber piece 6 in opposed relationship to the radiator tank 1b is formed with a radiator mounting hole 62. A bolt 63 is inserted in the radiator mounting hole 62 (FIG. 10), and the bracket with a rubber piece 6 is fixed to the radiator tank 1b.

As explained above, since the rubber bushing 30 and the brackets with a rubber piece 6 having the radiator mounting holes 62 are arranged on the upper surface of the condenser 2, the radiator 1 and the condenser 2 can be fixed to each other. In the process, the fastening means between the radiator 1 and the condenser 2 comprise only the bracket with a rubber piece 6. In other words, the upper brackets with a pin 51 according to the second embodiment can be eliminated. As a result, while maintaining similar effects to those of the second embodiment, the number of parts can be reduced resulting in a lower cost.

Fourth Embodiment

Now, a fourth embodiment of the invention is explained with reference to FIGS. 12 to 14. The difference of the fourth embodiment lies in that the bracket with a rubber piece 6 and the fastening bracket 4 are different in shape from those of the third embodiment. The component parts similar to those of the third embodiment are designated by the same reference numerals, respectively, and not described hereafter.

Figure 12:
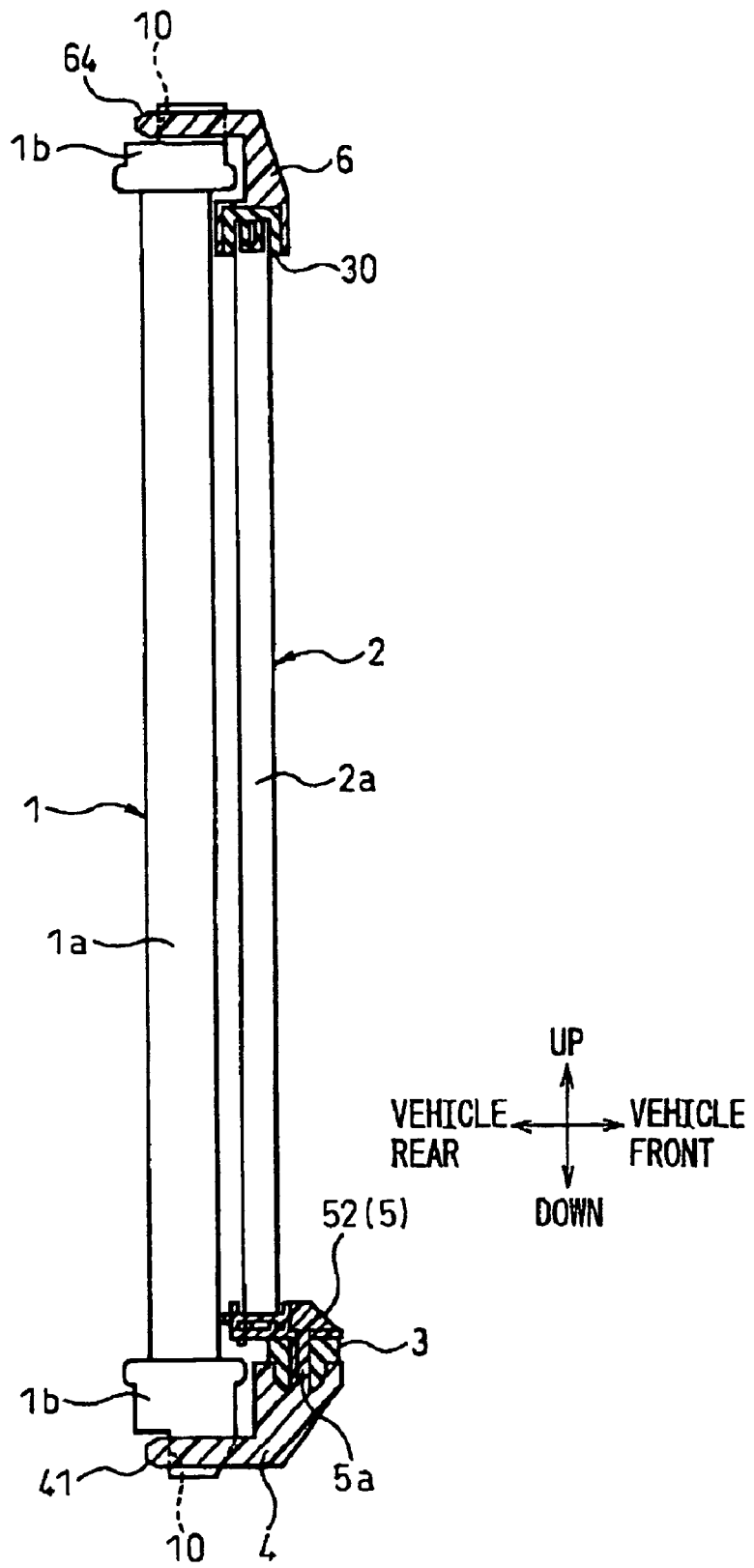
FIG. 12 is a sectional view of a cooling module according to a fourth embodiment of the invention.

FIG. 12 is a sectional view of a cooling module according to the fourth embodiment of the invention. As shown in FIG. 12, a through hole 10 is formed at each longitudinal end of the radiator tank 1b. Each through hole 10 is formed through the radiator tank 1b. One of the openings of the through hole 10 is formed on the surface of the radiator tank 1b on which the condenser 2 is fixed (forward on the vehicle), and the other opening is formed on the surface (rearward on the vehicle) far from the surface on which the condenser 2 is fixed. In this way, the through holes 10 extend through rearward from the vehicle front.

Figure 13:
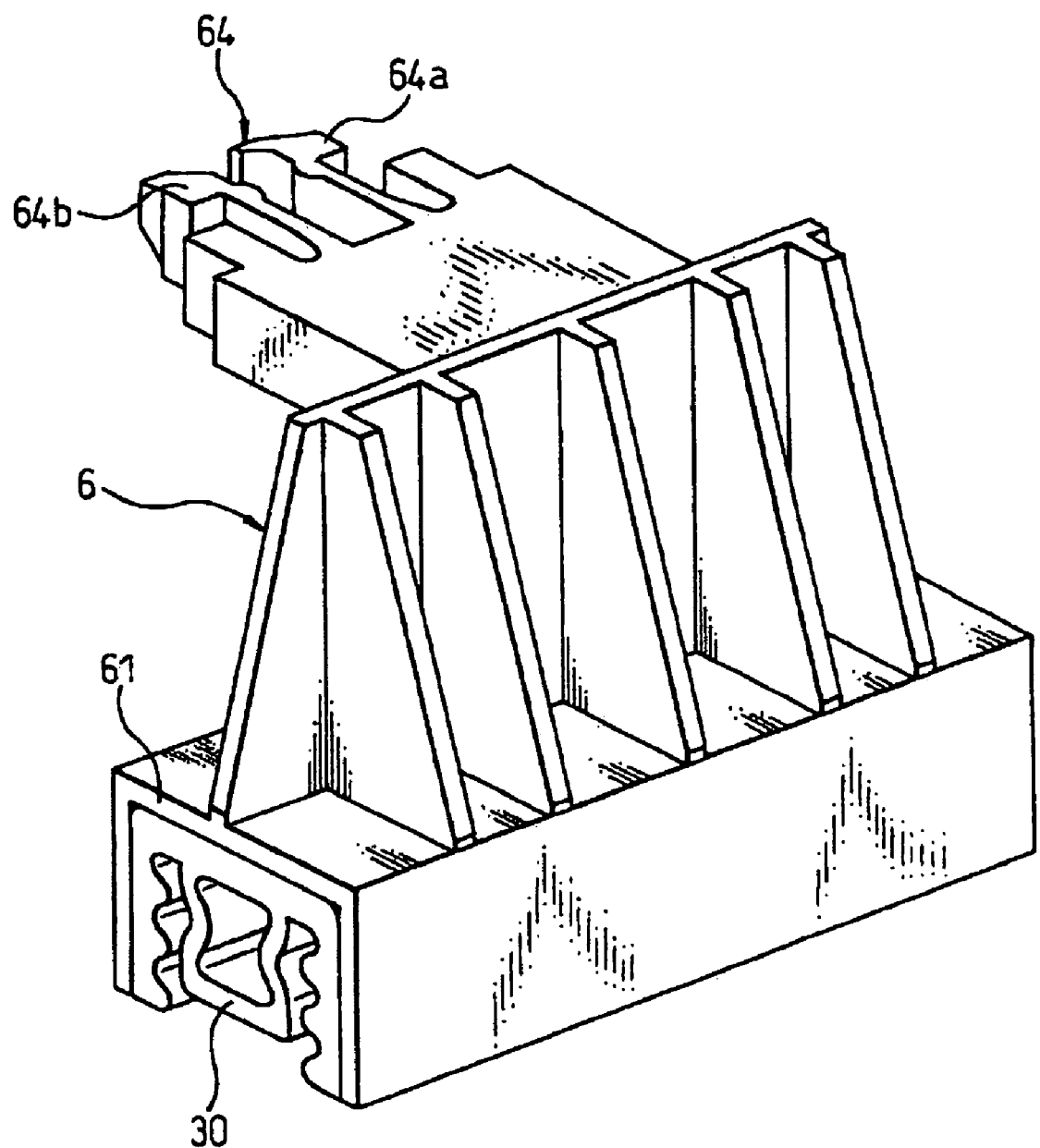
FIG. 13 is a perspective view of the bracket with a rubber piece 6 according to the fourth embodiment of the invention.

FIG. 13 is a perspective view showing the bracket with a rubber piece 6 according to the fourth embodiment of the invention. As shown in FIGS. 12 and 13, each bracket with a rubber piece 6 includes an elastically deformable first hook 64 projected toward the radiator tank 1b (rearward on the vehicle).

The first hook 64 is adapted to be fitted in the corresponding through hole 10 of the upper radiator tank 1b, and by being inserted from one of the openings of the through hole 10, engages the edge of the other opening. The first hook 64 is configured of a pair of elastically deformable engaging pieces 64a, 64b. The engaging pieces 64a, 64b are each formed with a protrusion adapted to engage the edge of the other opening of the through hole 10.

The hook 61 is inserted into the through hole 10 while the engaging pieces 64a, 64 are pressed against the inner wall of the through hole 10 and elastically deformed in proximity to each other. After the first hook 64 is inserted through the hole 10, the elastic deformation of the engaging piece pair 64a, 64b is canceled, so that the protrusion comes to engage the edge of the other opening. With the first hooks 64 engaging the through holes 10 in this way, the condenser 2 is fixed to the radiator 1.

Figure 14:
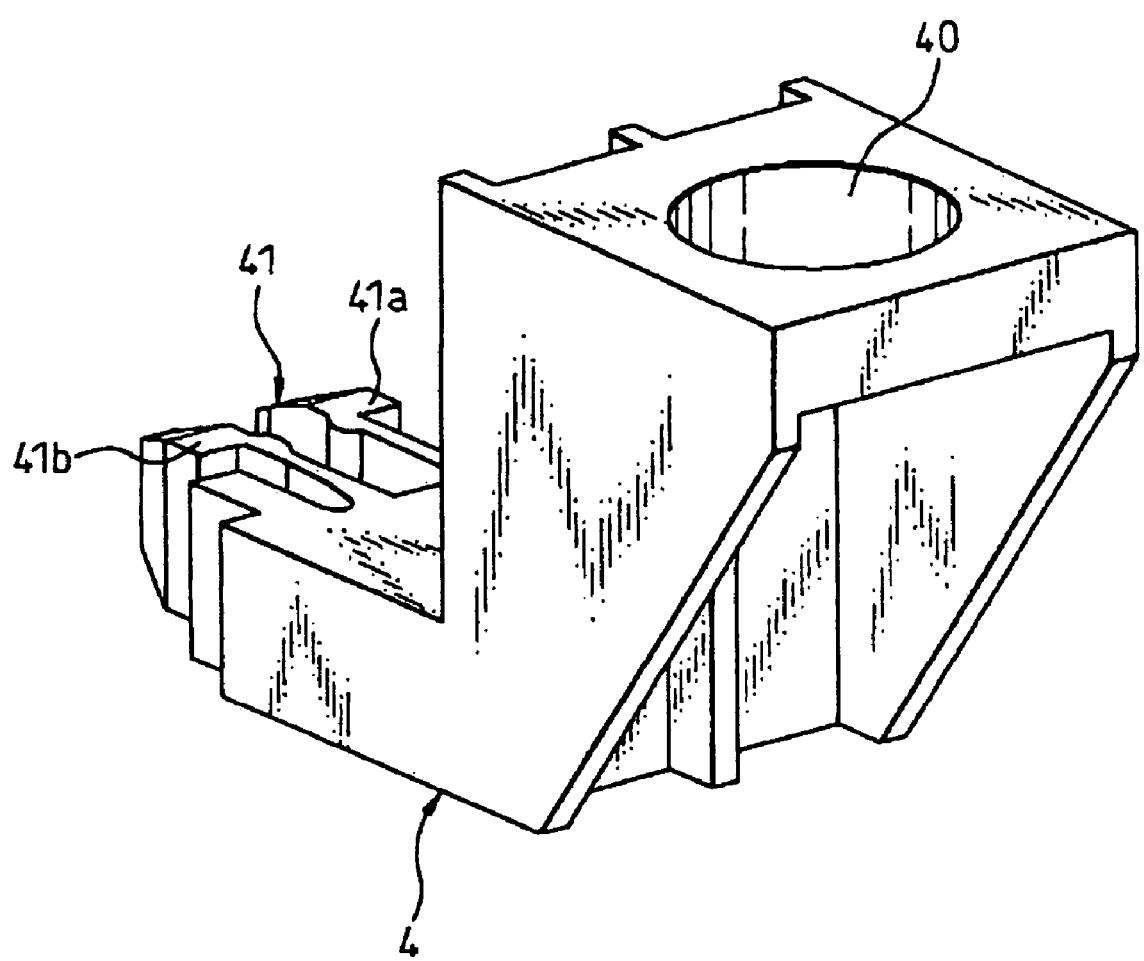
FIG. 14 is a perspective view of a fastening bracket 4 according to the fourth embodiment of the invention.

FIG. 14 is a perspective view showing the fastening bracket 4 according to the fourth embodiment. As shown in FIGS. 12 and 14, the fastening bracket 4 has an elastically deformable second hook 41 projected toward the radiator tank 1b (rearward on the vehicle). The second hook 41, like the first hook, includes a pair of engaging pieces 41a, 41b. The second hook 41 and the through hole 10 engage each other in the same structure as the first hook 64 and the through hole 10 described above. The engaging structure, therefore, is not described hereafter.

As explained above, the condenser 2 can be fixed to the radiator 1 by rendering the hooks 41, 64 to engage the through holes 10 of the radiator tank 1b. In the process, another fastening member such as a bolt is not required, and therefore, the number of the parts can be further reduced resulting in a lower cost.

Fifth Embodiment

Next, a fifth embodiment of the invention is explained with reference to FIGS. 15 to 18. The component parts similar to those of the third embodiment described above are designated by the same reference numerals, respectively, and not described hereafter.

Figure 15:
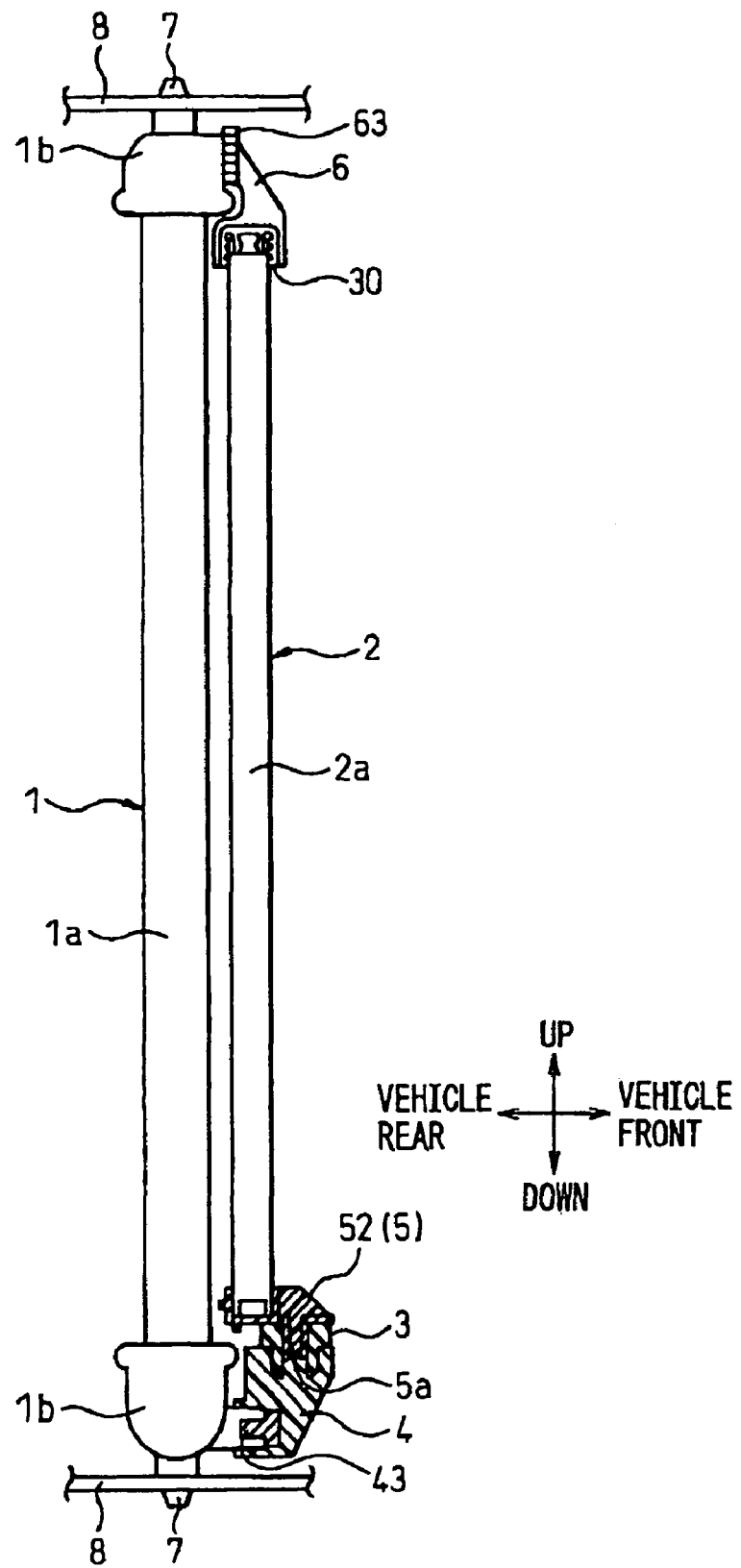
FIG. 15 is a sectional view of a cooling module according to a fifth embodiment of the invention.

FIG. 15 is a sectional view showing a cooling module according to the fifth embodiment. As shown in FIG. 15, the radiator 1 according to this embodiment is fixed to the vehicle body 8 through an elastically deformable rubber damper 7. As a result, the cooling module is fixed to the vehicle body 8.

With the cooling module according to this embodiment having the aforementioned configuration, the inventors have studied the natural frequency of the elastic members 3, 30.

Figure 16:
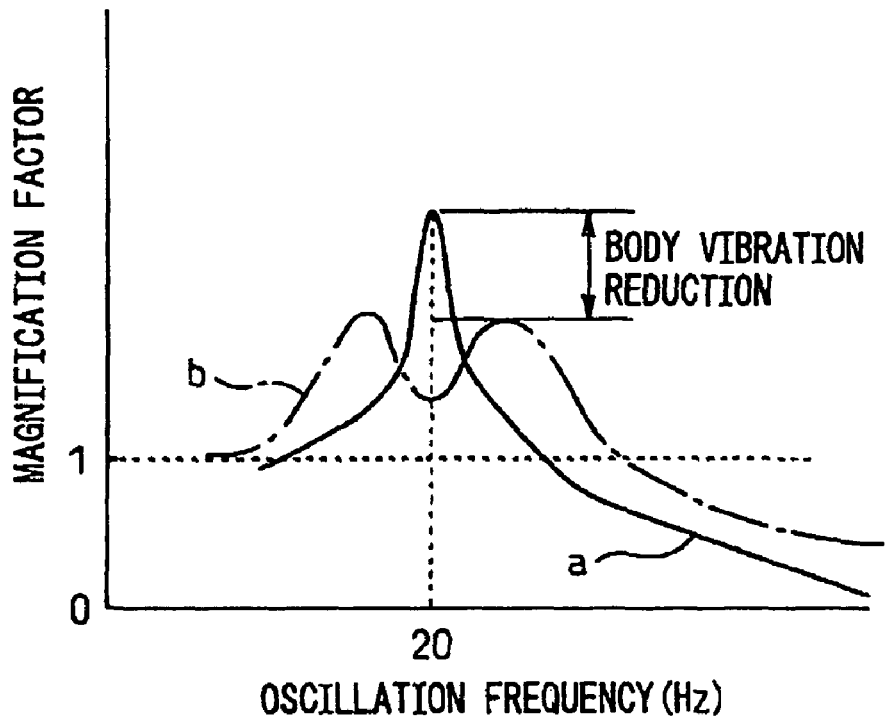
FIG. 16 is a characteristic diagram showing the vibration generated in the vehicle body a according to the fifth embodiment.

FIG. 16 is a characteristic diagram showing the vibration generated in the vehicle body 8, in which the abscissa represents the oscillation frequency and the ordinate the magnification factor.

This embodiment employs a four-cylinder engine with an idle engine speed of 600 rpm. As indicated by a solid line in FIG. 16, the natural frequency of the primary vibration mainly configured of the combustive explosion component of the engine in idle mode is 20 Hz. The spring constant of the rubber damper 7 is tuned to be substantially the same natural frequency (17 to 20 Hz) as the primary vibration of the engine. In this way, the radiator 1 functions as a mass of the dynamic damper. As a result, the spread of engine vibration to the vehicle body 8 can be suppressed as indicated by dashed line b in FIG. 16.

Figure 17A:
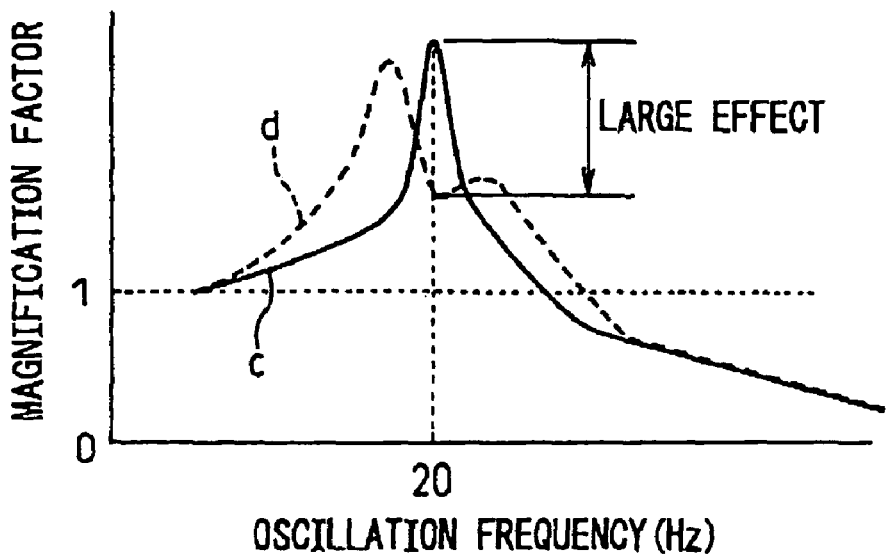
FIG. 17A is a characteristic diagram showing the vibration generated in the radiator 1 according to the fifth embodiment, wherein the natural frequency of the elastic members 3, 30 is set to a level 1.5 times the natural frequency of the rubber damper 7.
Figure 17B:
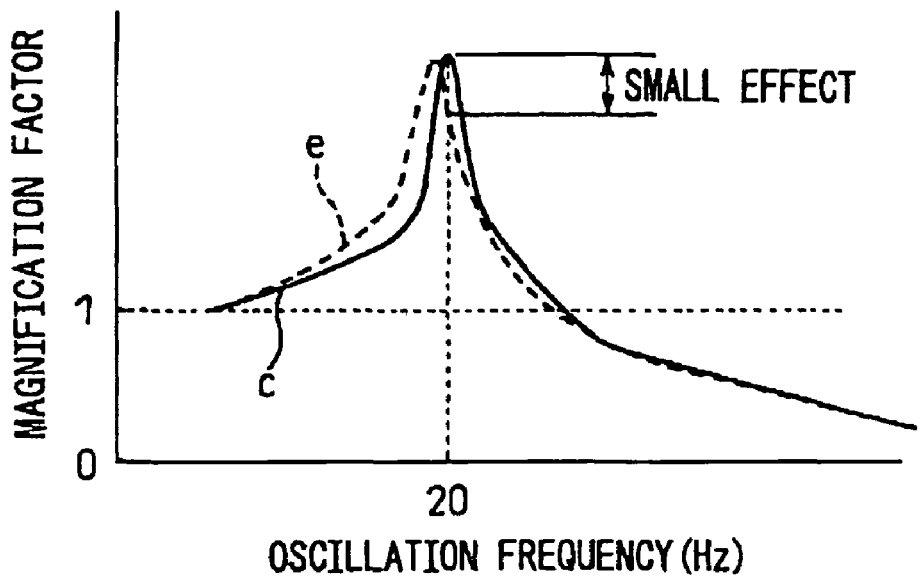
FIG. 17B is a characteristic diagram showing the vibration generated in the radiator 1 according to the fifth embodiment, wherein the natural frequency of the elastic members 3, 30 is set to a level 2 times the natural frequency of the rubber damper 7.
Figure 17C:
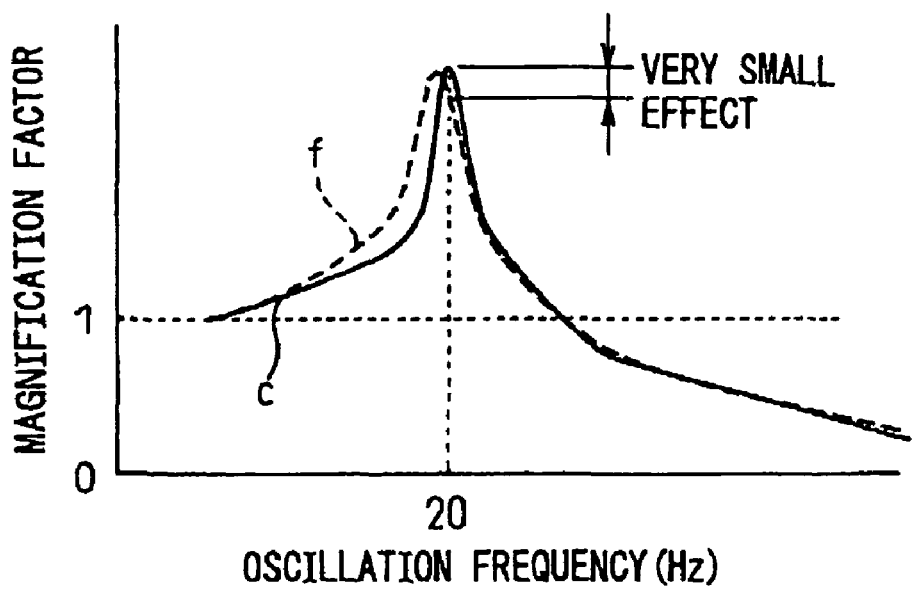
FIG. 17C is a characteristic diagram showing the vibration generated in the radiator 1 according to the fifth embodiment, wherein the natural frequency of the elastic members 3, 30 is set to a level 3 times the natural frequency of the rubber damper 7.

FIGS. 17A to 17C are characteristic diagrams showing the vibration generated in the radiator 1 with the natural frequency of the rubber damper 7 set to 20 Hz. FIG. 17A shows a case in which the natural frequency of the elastic members 3, 30 is set to 1.5 times the natural frequency of the rubber damper 7, FIG. 17B a case in which the natural frequency of the elastic members 3, 30 is set to twice the natural frequency of the rubber damper 7, and FIG. 17C a case in which the natural frequency of the elastic members 3, 30 is set to 3 times the natural frequency of the rubber damper 7. In FIGS. 17A to 17C, the abscissa represents the oscillation frequency, and the ordinate the magnification factor. Also, the solid line c indicates a case in which the radiator 1 is used as a unit (with the condenser 1 not fixed on the radiator 1), and dashed lines d, e, f a case in which the condenser 2 is fixed on the radiator 1 through the elastic members 3, 30.

As shown in FIG. 17A, in the case where the natural frequency of the elastic members 3, 30 is set to 1.5 times (30 Hz according to this embodiment) the natural frequency of the rubber damper 7, the difference of the natural frequency between the elastic members 3, 30 and the rubber damper 7 is reduced. As a result, the condenser 2 itself acts as a mass of the dynamic damper for absorbing the vibration energy of the radiator 1, and as shown by dashed line d in FIG. 17A, the vibration of the radiator 1 is absorbed into the condenser 2. Thus, the function of the radiator 1 to act as a mass of the dynamic damper for absorbing the engine vibration energy is hampered. In the case where the natural frequency of the elastic members 3, 30 is set to 1.5 times the natural frequency of the rubber damper 7, therefore, the condenser 2 has a great effect on the function of the radiator 1 to work as a mass of the dynamic damper of the radiator 1.

In the case where the natural frequency of the elastic members 3, 30 is set to twice (40 Hz according to this embodiment) the natural frequency of the rubber damper 7, as shown in FIG. 17B, on the other hand, the difference of the natural frequency is increased between the elastic members 3, 30 and the rubber damper 7. As shown by dashed line e in FIG. 17B, the condenser 2 itself never functions as a mass of the dynamic damper for absorbing the vibration energy of the radiator 1, and therefore, the condenser 2 has a lesser effect on the operation of the radiator 1 as a mass of the dynamic damper.

Further, as shown in FIG. 17C, in the case where the natural frequency of the elastic members 3, 30 is set to 3 times (60 Hz according to this embodiment) the natural frequency of the rubber damper 7, the difference of the natural frequency is further increased between the elastic members 3, 30 and the rubber damper 7. As shown by dashed line f in FIG. 17C, therefore, the condenser 2 has a lesser effect on the operation of the radiator 1 as a mass of the dynamic damper.

The experiments and study conducted by the present inventors described above show that in the case where the difference of the natural frequency between the rubber damper 7 and the elastic members 3, 30 is twice or greater, i.e. the natural frequency of one of the rubber damper 7 and the elastic members 3, 30 is twice or more than the natural frequency of the other, the function of the radiator 1 as a mass of the dynamic damper is not adversely affected. The relationship between the natural frequency of the rubber damper 7 and that of the elastic members 3, 30, therefore, is considered to be either "the natural frequency of the elastic members 3, 30 is at least twice the natural frequency of the rubber damper 7" or "the natural frequency of the elastic members 3, 30 is one half or less of the natural frequency of the rubber damper 7".

Of all the parts assembled on the vehicle body 8, the heavy parts such as the radiator 1 and the condenser 2 are required to be designed not to resonate with vibrations (such as one generated when driving on a rough road) that may be generated in the normally running vehicle. The frequency of the vibration that may be generated in the vehicle running normally as described above is called the critical frequency range, and the natural frequency of the parts mounted on the vehicle body 8 are required to assume a value outside the critical frequency range. The critical frequency range is normally as low as 15 Hz or less, and therefore, in the case where the natural frequency of the elastic members 3, 30 is reduced to one half or less of the natural frequency of the rubber damper 7, therefore, the natural frequency of the elastic members 3, 30 would be undesirably included in the critical frequency range of not higher than 15 Hz. By setting the natural frequency of the elastic members 3, 30 to at least twice the natural frequency of the rubber damper 7, on the other hand, the natural frequency of the elastic members 3, 30 becomes 40 Hz or higher and is not included in the critical frequency range. According to this embodiment, the lower limit of the natural frequency of the elastic members 3, 30 is set to twice the natural frequency of the rubber damper 7. Specifically, in the case where a four-cylinder engine having an engine idle speed of 600 rpm is used as in this embodiment, the lower limit of the natural frequency of the elastic members 3, 30 is set to 40 Hz.

Figure 18:
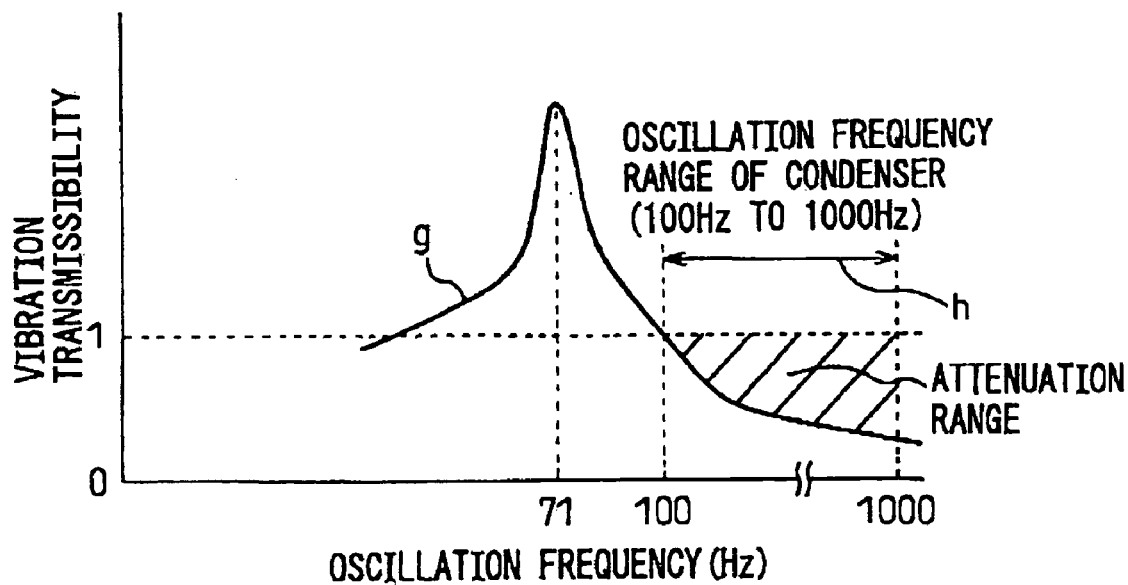
FIG. 18 is a graph showing the vibration absorbing function of the elastic members 3, 30 according to the fifth embodiment of the invention.

FIG. 18 is a graph showing the damping operation of the elastic members 3, 30, in which the abscissa represents the oscillation frequency generated from the condenser 2 and the ordinate the ratio (transmissibility) between the vibration acceleration generated in the condenser 2 and the vibration acceleration measured on the vehicle body 8. Specifically, in the case where the transmissibility is less than unity, it indicates that the vibration has been absorbed into the elastic members 3, 30. The vibration generated in the condenser 2 is attributable to the discharge pulsation of the refrigerant of the compressor for compressing and discharging the refrigerant circulated in the vehicle refrigeration cycle (climate control system) not shown.

In FIG. 18, the solid line g represents the measurement result according to this embodiment. As indicated by arrow h, the frequency range of the vibration generated in the condenser 2 according to this embodiment is 100 Hz to 1000 Hz. This measurement is conducted by causing the condenser 2 to generate a vibration in this frequency range. In order to attenuate the vibration over the whole frequency range of the vibration generated in the condenser 2, the natural frequency of the elastic members 3, 30 is required to be below the minimum value (100 Hz in this embodiment) in the frequency range of the vibration generated in the condenser 2.

Theoretically, the transmissibility of the elastic members 3, 30 assumes a value less than unity and the vibration thereof can be attenuated in the frequency range larger than $\sqrt{2}$ times the natural frequency thereof. In order to attenuate the vibration over the whole frequency range of the vibration generated in the condenser 2, therefore, the natural frequency of the elastic members 3, 30 is required to be less than $1/\sqrt{2}$ times the minimum value in the frequency range of the vibration generated in the condenser 2. Specifically, according to this embodiment, the natural frequency of the elastic members 3, 30 is set to less than about 71 Hz in the case where the oscillation frequency generated by the discharge pulsation of the refrigerant of the compressor is not less than 100 Hz.

Further, a higher vibration attenuation effect can be obtained in the case where the natural frequency of the elastic member 3, 30 is reduced to less than one half (50 Hz in this embodiment) of the minimum value in the frequency range of the vibration generated by the condenser 2.

For the same reason described above, in order to reduce the spread of engine idle vibration to the vehicle body 8 and steering system, the natural frequency of one of the rubber damper 7 and the elastic members 3, 30 is set to at least twice the natural frequency of the other.

Further, in order to prevent the natural frequency of the elastic members 3, 30 from being included in the critical frequency range, the natural frequency of the elastic members 3, 30 is set to at least twice the natural frequency of the rubber damper 7. Specifically, the lower limit of the natural frequency of the elastic members 3, 30 is set to 40 Hz.

Also, in order to suppress the propagation of the vibration of the condenser 2 to the vehicle body 8, the natural frequency of the elastic members 3, 30 is set to a value lower than $1/\sqrt{2}$ times the oscillation frequency. Specifically, as described above, the natural frequency of the elastic members 3, 30 can be set to less than 71 Hz. More desirably, the natural frequency of the elastic members 3, 30 is set to less than 60 Hz.

Further, in order to more positively suppress the spread of the vibration from the condenser 2 to the vehicle body 8, the natural frequency of the elastic members 3, 30 is set to lower than one half of the oscillation frequency. Specifically, the natural frequency of the elastic members 3, 30 can be set to less than 50 Hz as described above.

As described above, by setting the natural frequency of the elastic members 3, 30 in the range of 40 Hz inclusive to 71 Hz not inclusive, vibration in the compartment attributable to the discharge pulsation of the compressor can be reduced, while at the same time making it possible to reduce the spread of engine idle vibration to the vehicle body 8 and steering system. Desirably, the natural frequency of the elastic members 3, 30 is set in the range of 40 Hz inclusive to 60 Hz not inclusive, or more desirably in the range of 40 Hz inclusive to 50 Hz not inclusive.

Sixth Embodiment

Figure 19:
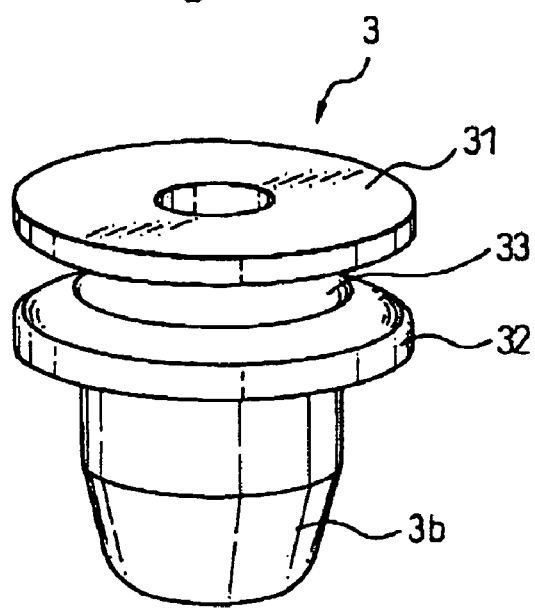
FIG. 19 is a perspective view of a rubber bushing 3 according to a sixth embodiment.
Figure 20:
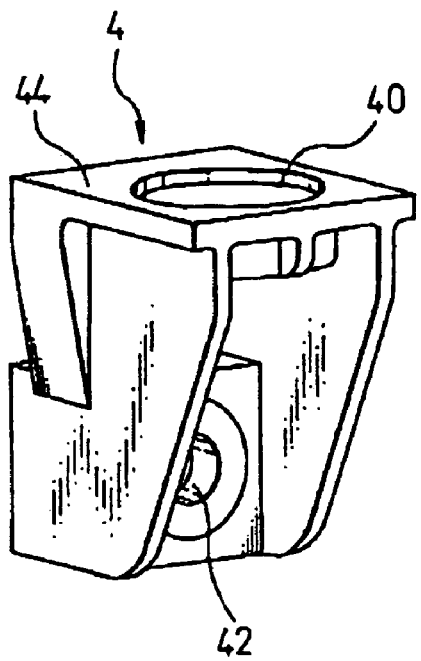
FIG. 20 is a perspective view of a bracket 4 according to the sixth embodiment.

Next, a sixth embodiment of the invention is explained with reference to FIGS. 19, 20 and 21. The component parts similar to those of the embodiments described above are designated by the same reference numerals, respectively, and not explained hereafter. According to this embodiment, the rubber bushings shown in FIG. 19 is used in place of the rubber bushings in the second embodiment, and each rubber bushing 3 is assembled on the corresponding fastening bracket 4 shown in FIG. 20.

The rubber bushing 3 has an upper disk portion 31, a lower disk portion 32 and a small diameter portion 33 located between the upper and lower disk portions 31, 32 and having a smaller diameter than the upper and lower disk portions 31, 32.

The bracket 4 has a receiving surface 44 formed with a through hole 40 into which the substantially conical portion 3b of the rubber bushing 3 is adapted to be inserted, and a bolt hole 42. The portion formed with the bolt hole 42 is rectangular and acts as a stopper.

Figure 21:
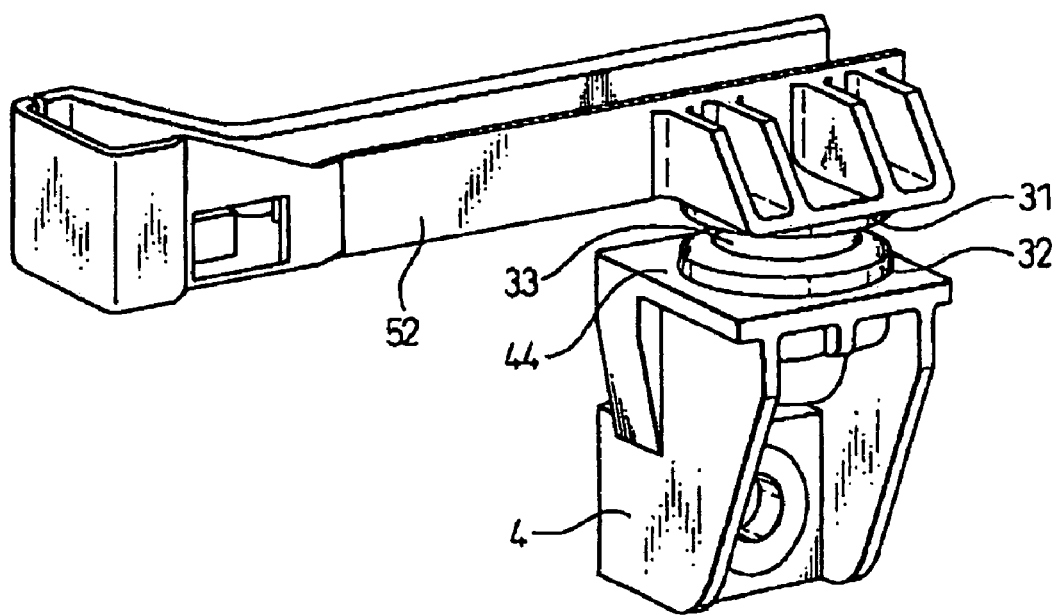
FIG. 21 is a perspective view showing the neighborhood of a lower bracket with pin 52 according to the sixth embodiment.

The lower brackets w/pin 52, the rubber bushings 3 and the brackets 4 are each assembled in such a manner that as shown in FIG. 21, the lower surface of the lower bracket w/pin 52 and the upper disk portion 31 are in contact with each other on the one hand and the receiving surface 44 of the bracket 4 and the lower disk portion 32 are in contact with each other on the other hand. The rubber bushing 3, having a small diameter portion 33, is suitable for a vehicle low in oscillation frequency.

Other Embodiments

Figure 22:
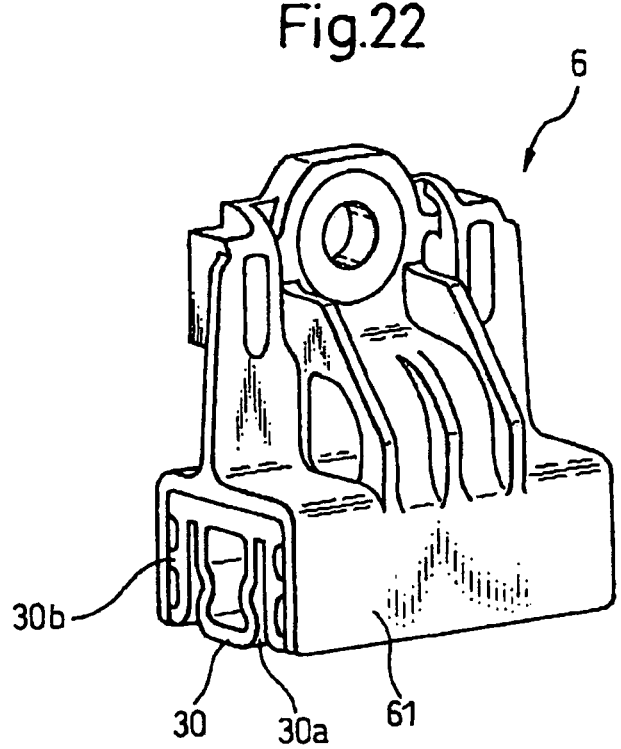
FIG. 22 is a perspective view showing a variation of the bracket with a rubber piece 6.

The brackets with rubber piece according to the third embodiment may be replaced with the brackets with rubber piece 6 shown in FIG. 22. In each bracket with rubber piece 6, the portion 30a of the rubber bushing 30 arranged on the inside of the receiving portion 61 into which the upper end of the condenser 2 is inserted is substantially flat, and the portions of the rubber bushing 30 in opposed relationship to the inside of the receiving portion 61 are each formed with a protrusion 30b for absorbing the longitudinal vibration of the vehicle. By making the bracket with rubber piece 6 into this shape, the upper end portion of the condenser 2 can be smoothly inserted.

Figure 23:
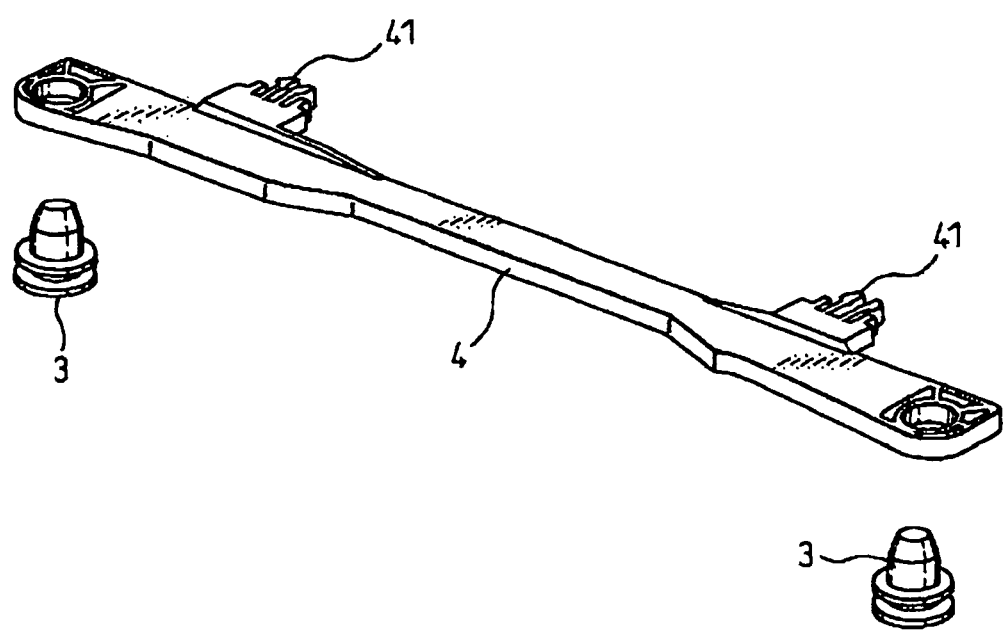
FIG. 23 is a perspective view showing a variation of the bracket 4.

Also, as shown in FIG. 23, a pair of the left and right brackets 4 may be integrated into a structure, and like the fixing structure shown in FIG. 4, may be fixed to the radiator 1 by elastically deformable hooks 41.

Each embodiment of the invention described above is applicable to a down-flow radiator 1 in which cooling water flows in a vertical direction. Nevertheless, the invention is also applicable to a cross-flow radiator in which cooling water flows in a horizontal direction.

Also, unlike the embodiments described above using the rubber bushing 3 (rubber bushing 30) as an elastic member, materials other than rubber, such as an elastomer, which can absorb vibration due to the discharge pulsation of the refrigerant of the compressor can be used with equal effect.

Also, in place of the brackets formed of plastic in the aforementioned embodiments, metal brackets, such as aluminum may be used.

Any of the embodiments described above can be combined appropriately.

While the invention has been described with reference to specific embodiments chosen for purposes of illustration, it should be apparent that numerous modifications could be made thereto by those skilled in the art without departing from the basic concept and scope of the invention.

The invention claimed is:

1. A cooling module comprising:
   a radiator mounted to a vehicle for cooling water by heat exchange between the cooling water and air;
   a condenser for condensing refrigerant by heat exchange between the refrigerant circulated in a refrigerant cycle and the air, the condenser including a condenser core formed of a plurality of condenser tubes and two opposed sidewalls extending in parallel with surfaces of the condenser core, from an outer peripheral portion of the condenser core;
   a plurality of mounting members for fixing the condenser to the radiator; and
   a plurality of elastic members each coupled with a respective mounting member;
   wherein the elastic member has a first portion disposed between the sidewalls of the condenser and formed to be elastically deformable in a vertical and a horizontal direction
   wherein the radiator is fixed to the vehicle body through a plurality of elastically deformable support members, and
   wherein the natural frequency of the elastic members is set to be at least twice or not more than one half of the natural frequency of the elastic support members.

2. The cooling module according to claim 1, wherein the elastic member further has two opposed second portions each adapted to bear against an outside surface of the sidewall.

3. The cooling module according to claim 2, wherein the elastic member has two opposed grooves between the first and second portions, which are configured to fittingly receive the sidewalls, respectively.

4. The cooling module according to claim 1,
   wherein the radiator includes a radiator core having a plurality of tubes with the cooling water flowing therein and a pair of radiator tanks extending in the direction perpendicular to the length of the tube at the longitudinal ends of the tubes and communicating with the tubes,
   wherein the radiator tanks are arranged at the vertical ends of the radiator core and each make up a down-flow heat exchanger with the cooling water vertically, and
   wherein the mounting members are fixed to the radiator tanks.

5. The cooling module according to claim 1, wherein the mounting members are each formed with a depressed receptacle in which the elastic member is arranged.

6. The cooling module according to claim 1,
   wherein the natural frequency of the elastic members is set to at least twice the natural frequency of the elastic support members.

7. The cooling module according to claim 1, wherein the first portion of the elastic member comprises a hollow portion extending in the same direction as that of the sidewalls.

8. A cooling module comprising:
   a radiator mounted to a vehicle for cooling water by heat exchange between the cooling water and air;
   a condenser for condensing refrigerant by heat exchange between the refrigerant circulated in a refrigerant cycle and the air, the condenser including a condenser core formed of a plurality of condenser tubes and two opposed sidewalls extending in parallel with surfaces of the condenser core, from an outer peripheral portion of the condenser core;
   a plurality of mounting members for fixing the condenser to the radiator; and
   a plurality of elastic members each coupled with a respective mounting member;
   wherein the elastic member has a first portion disposed between the sidewalls of the condenser and formed to be elastically deformable in a vertical and a horizontal direction;
   wherein the refrigeration cycle includes a compressor for compressing and discharging refrigerant, and
   wherein the natural frequency of the elastic members is set lower than the oscillation frequency generated by the discharge pulsation of the refrigerant in the compressor in such a manner that the elastic members attenuate the vibration generated by the discharge pulsation over the whole oscillation frequency range thereof.

9. The cooling module according to claim 8,
   wherein the natural frequency of the elastic members is set to a level lower than ½ times the oscillation frequency.

10. The cooling module according to claim 8,
wherein the natural frequency of the elastic members is set to a level lower than $1/\sqrt{2}$ times the oscillation frequency.

11. A cooling module comprising a radiator mounted to the vehicle for cooling the cooling water by heat exchange between the cooling water and the air and a condenser for condensing the refrigerant by heat exchange between the refrigerant circulated in the refrigerant cycle and the air,
wherein the condenser is fixed to the radiator through elastically deformable elastic members
wherein the refrigeration cycle includes a compressor for compressing and discharging refrigerant, and
wherein the natural frequency of the elastic members is set lower than the oscillation frequency generated by the discharge pulsation of the refrigerant in the compressor in such a manner that the elastic members attenuate the vibration generated by the discharge pulsation over the whole oscillation frequency range thereof.

12. The cooling module according to claim 11,
wherein the natural frequency of the elastic members is set to a level lower than $1/\sqrt{2}$ times the oscillation frequency.

13. The cooling module according to claim 11,
wherein the natural frequency of the elastic members is set to a level lower than ½ times the oscillation frequency.

14. A cooling module comprising:
a radiator mounted to a vehicle for cooling water by heat exchange between the cooling water and air;
a condenser for condensing refrigerant by heat exchange between the refrigerant circulated in a refrigerant cycle and the air, the condenser including a condenser core formed of a plurality of condenser tubes and two opposed sidewalls extending in parallel with surfaces of the condenser core, from an outer peripheral portion of the condenser core;
a plurality of mounting members for fixing the condenser to the radiator; and
a plurality of elastic members each coupled with a respective mounting member;
wherein the elastic member has a first portion disposed between the sidewalls of the condenser and formed to be elastically deformable in a vertical and a horizontal direction;
wherein the elastic member further has two opposed second portions each adapted to bear against an outside surface of the sidewall;
wherein the elastic member has two opposed grooves between the first and second portions, which are configured to fittingly receive the sidewalls, respectively;
wherein surfaces of the grooves have a plurality of ridges formed to be in contact with outside surfaces of the sidewalls.

15. A cooling module comprising a radiator mounted to the vehicle for cooling the cooling water by heat exchange between the cooling water and the air and a condenser for condensing the refrigerant by heat exchange between the refrigerant circulated in the refrigerant cycle and the air,
wherein the condenser is fixed to the radiator through elastically deformable elastic members;
wherein the radiator is fixed to the vehicle body through a plurality of elastically deformable support members, and
wherein the natural frequency of the elastic members is set to be at least twice or not more than one half of the natural frequency of the elastic support members.

16. The cooling module according to claim 15,
wherein the natural frequency of the elastic members is set to at least twice the natural frequency of the elastic support members.

* * * * *